United States Patent
Kohda et al.

[11] Patent Number: 6,115,106
[45] Date of Patent: *Sep. 5, 2000

[54] IMAGE RECORDING APPARATUS

[75] Inventors: Hiroyuki Kohda; Kohji Uchida; Atsuhiro Doi; Yasuhiro Endo, all of Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/015,526

[22] Filed: Jan. 29, 1998

[30] Foreign Application Priority Data

Jan. 30, 1997 [JP] Japan ..................................... 9-017214
Jan. 30, 1997 [JP] Japan ..................................... 9-017216

[51] Int. Cl.[7] ............................. G03B 27/32; G03B 27/00
[52] U.S. Cl. ............................................. 355/64; 355/18
[58] Field of Search ............................. 355/405, 64, 18, 355/27, 200; 399/114, 162; 378/188; 100/26

[56] References Cited

U.S. PATENT DOCUMENTS

| | | | |
|---|---|---|---|
| 4,641,947 | 2/1987 | Ishida et al. | 355/75 |
| 4,941,015 | 7/1990 | Komai et al. | 355/200 |
| 4,969,009 | 11/1990 | Sugiyama et al. | 355/64 |
| 5,115,272 | 5/1992 | Ohmori et al. | 399/114 |
| 5,287,143 | 2/1994 | Hirota et al. | 399/114 |
| 5,636,961 | 6/1997 | Ohta | 378/188 |

FOREIGN PATENT DOCUMENTS

| | | | |
|---|---|---|---|
| 5-181246 | 7/1993 | Japan | G03C 8/40 |
| 6-161070 | 6/1994 | Japan | G03C 8/40 |
| 6-242546 | 9/1994 | Japan | G03C 1/498 |
| 6-289555 | 10/1994 | Japan | G03C 8/40 |

*Primary Examiner*—David M. Gray
*Assistant Examiner*—Peter B. Kim
*Attorney, Agent, or Firm*—Sughrue, Mion, Zinn, Macpeak & Seas, PLLC

[57] ABSTRACT

An image recording apparatus, in which a necessary place can be suitably exposed by simple operation and the workability of inspection, maintenance and the like improves, is obtained. In the image recording apparatus, an upper cover is rotatably connected to and supported at a base stand by an intermediate hinge. Accordingly, there are a first stage opened/closed state, in which the upper cover opens and closes around a supporting shaft, and a second stage opened/closed state, in which the upper cover integrally opens and closes along with the intermediate hinge around another supporting shaft. In the second stage opened state, the inner portion of the base stand is exposed by a large amount, the distal end portion of a stage is lifted, and further, the holding of a supply magazine and a take-up magazine is released. As a result, the innermost place within the apparatus is exposed and the workability of inspection and maintenance, such as replacement of the supply magazine or the take-up magazine, improves.

24 Claims, 24 Drawing Sheets

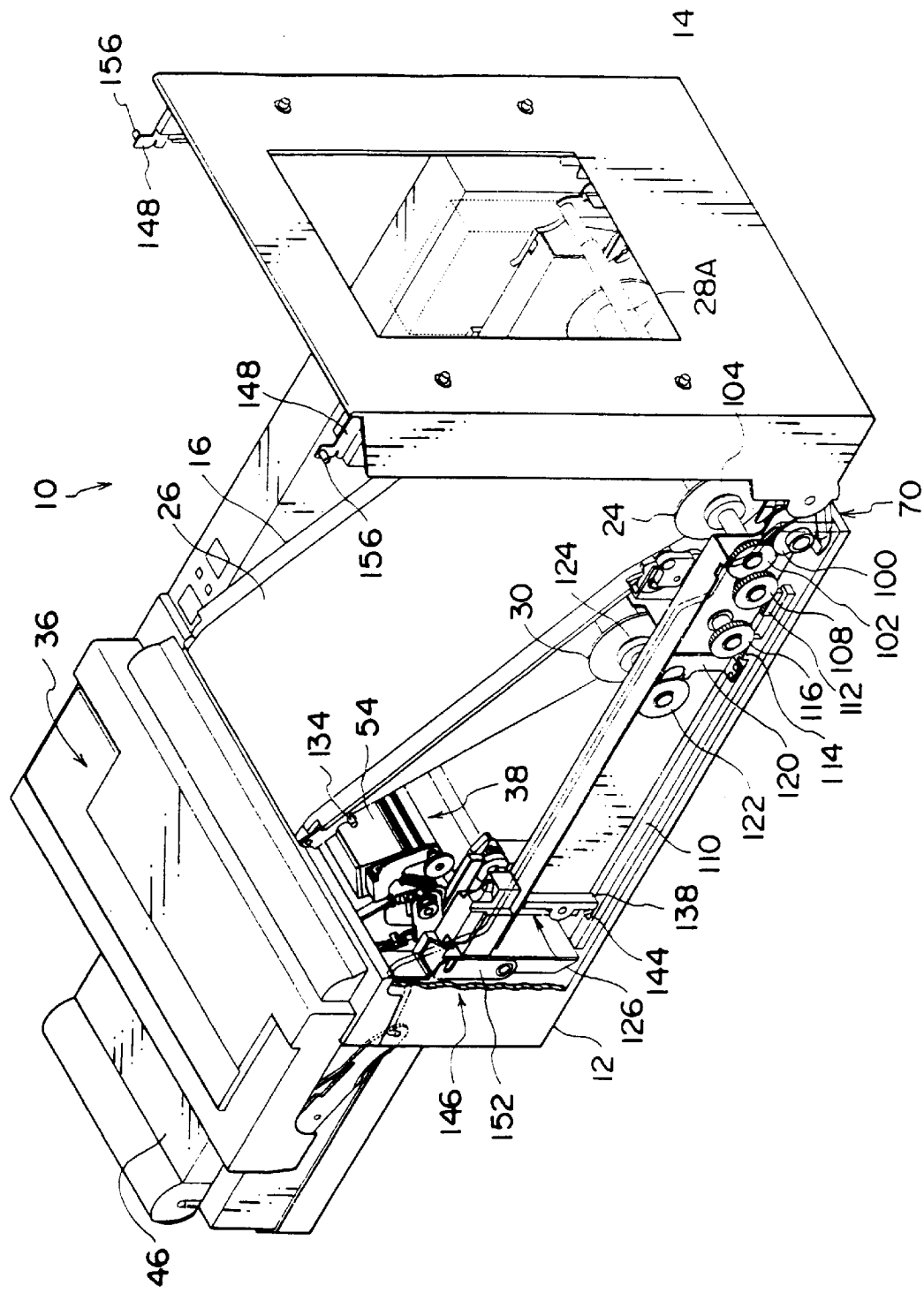

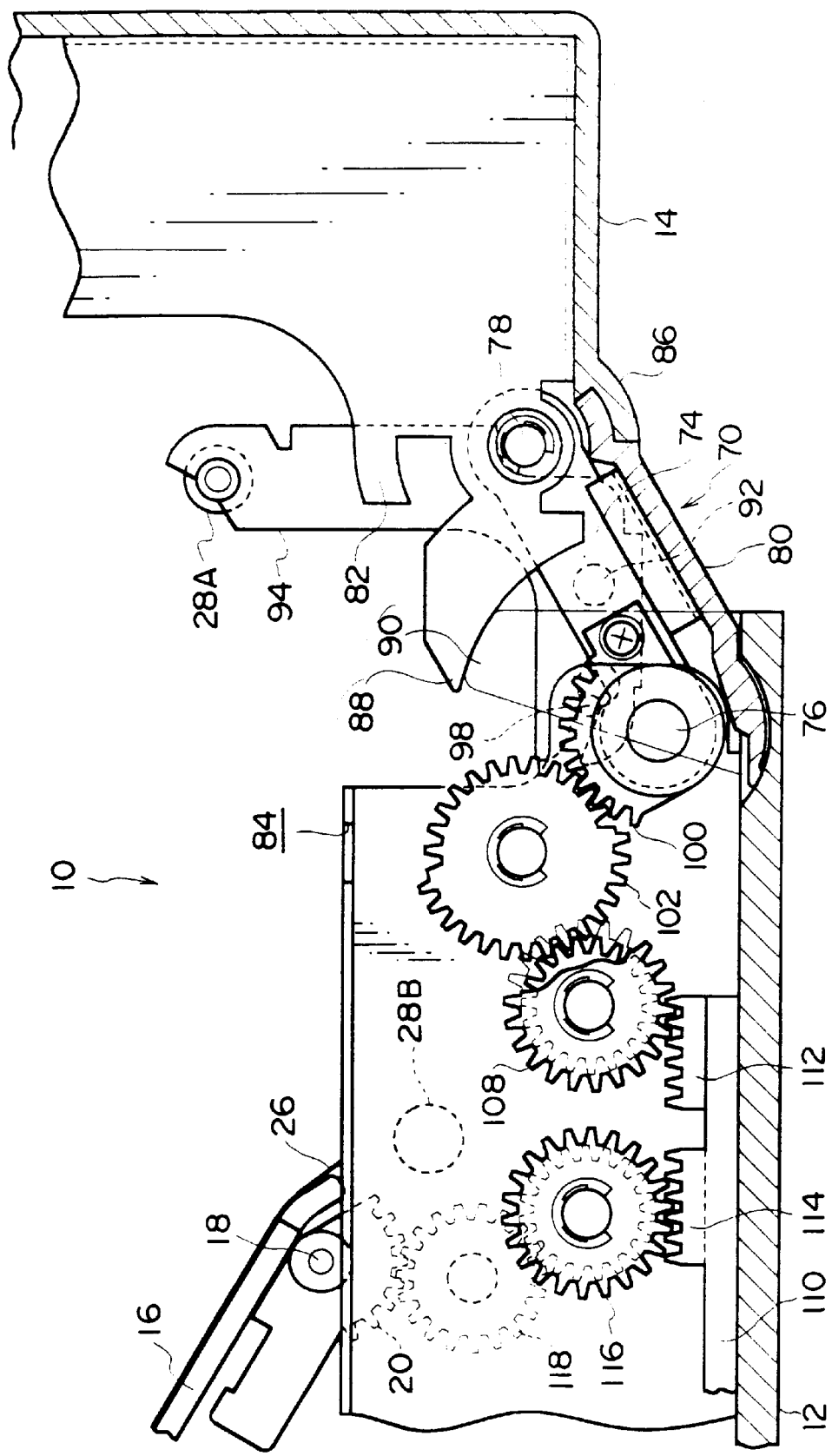

F I G. 1 4
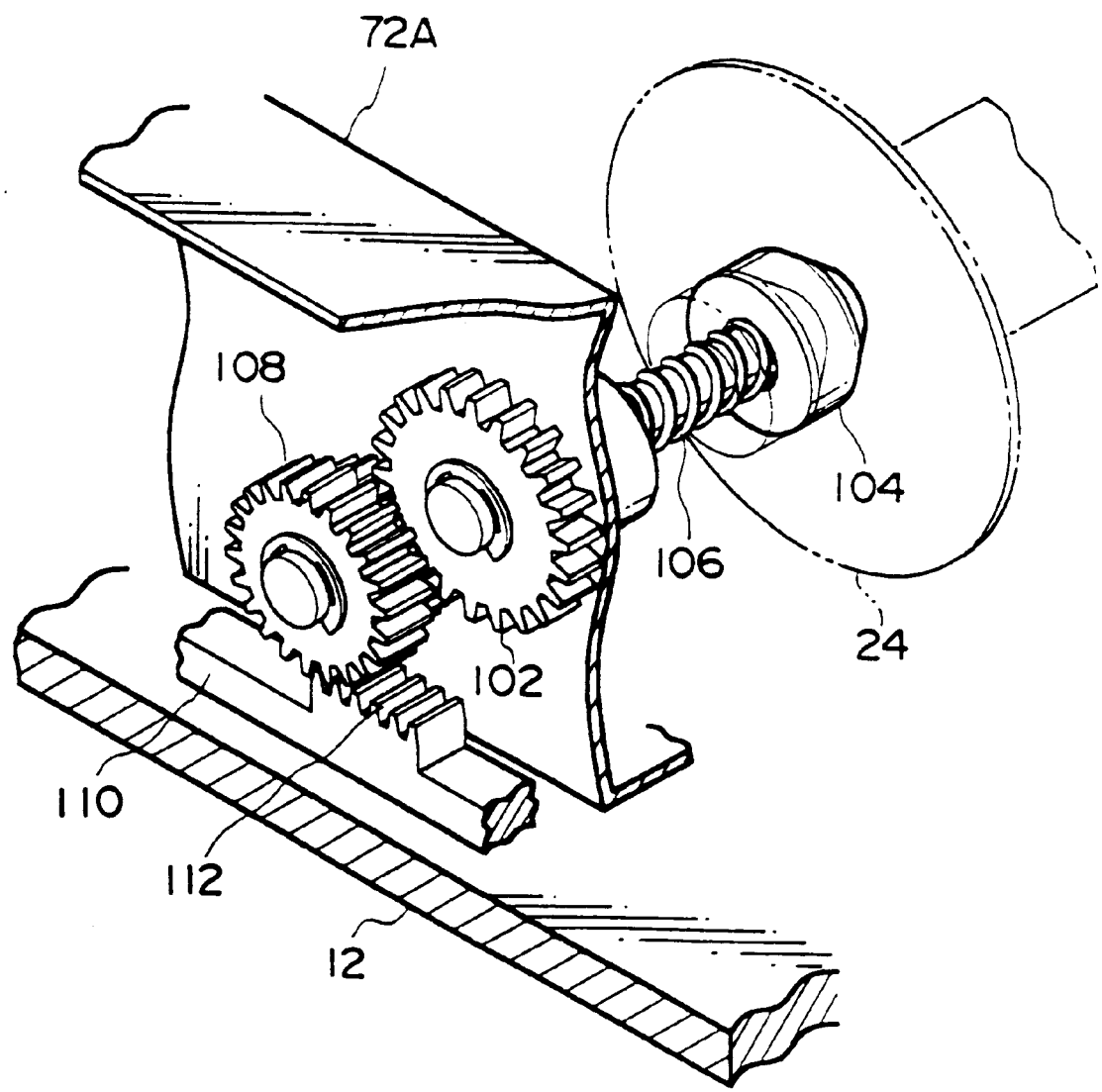

F I G. 1 9
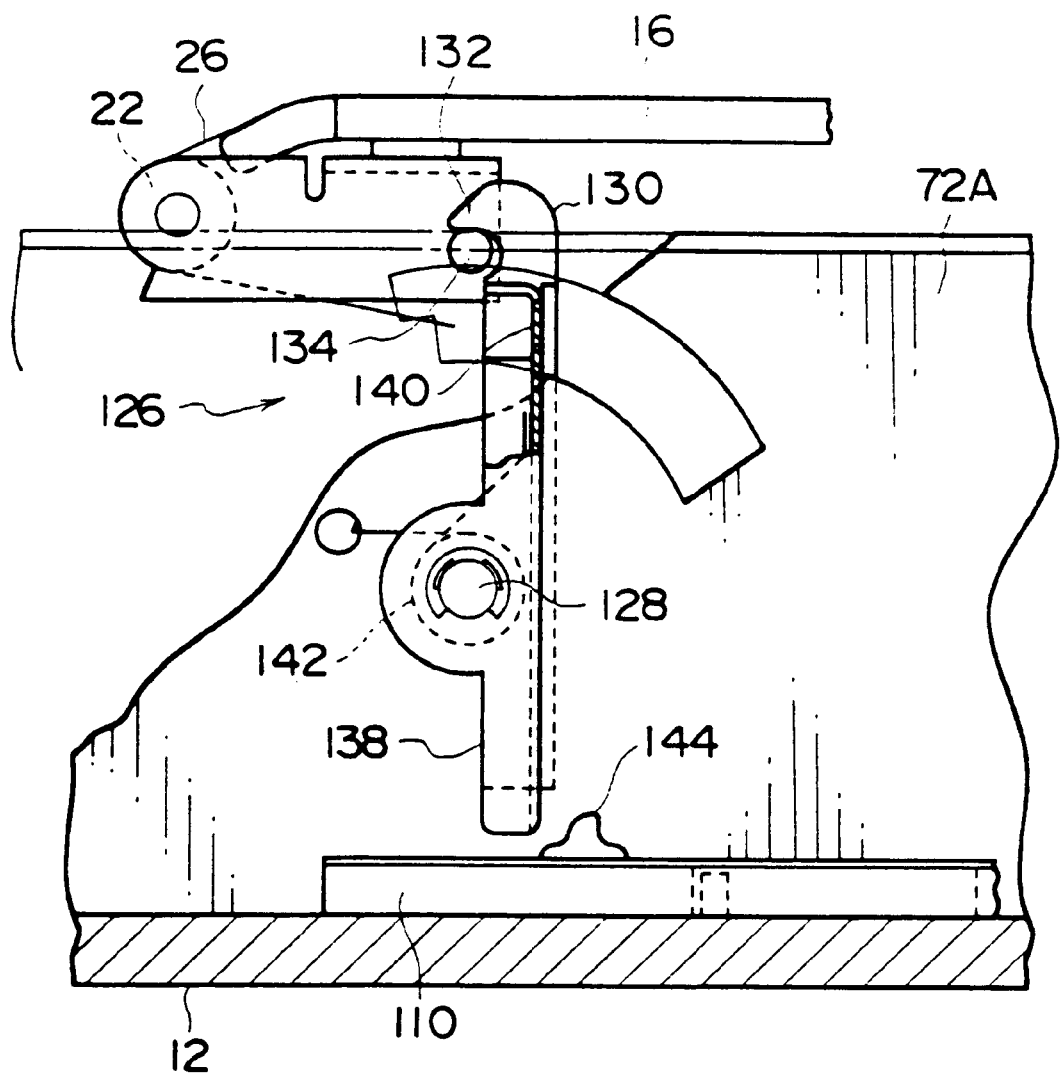

IMAGE RECORDING APPARATUS

BACKGROUND OF THE INVENTION

1. Field of the Invention

The present invention relates to an image recording apparatus in which a photosensitive material is exposed so as to obtain a visible image.

2. Description of the Related Art

In an image recording apparatus for obtaining a color image on a sheet material, the image of an original document is exposed onto a photosensitive material, the exposed photosensitive material and an image receiving material are superposed and heat-development-transferred, and an image is obtained on the image receiving material.

Among such image recording apparatuses, there is an image recording apparatus which includes a flat processing stage. This type of processing stage serves as an exposure stage and a heat plate, and serves as a plane surface for holding a photosensitive material when the image of a document is exposed onto the photosensitive material. Further, after the exposed photosensitive material and an image receiving material are superposed, the processing stage serves for heating and heat-development-transferring the exposed photosensitive material and the image receiving material in an adhered state. In the image recording apparatus having such processing stage, a photosensitive material magazine which accommodates the photosensitive material is disposed beneath the processing stage. On the other hand, above the processing stage, there are a water application portion which applies water to the photosensitive material withdrawn from the photosensitive material magazine, a paper feeding portion which withdraws and supplies the image receiving material from the image receiving material magazine, an attaching unit in which the supplied image receiving material is adhered to and superposed on the photosensitive material on the processing stage, and the like. As the attaching unit moves along the processing stage, the image receiving material is adhered to and superposed on the photosensitive material on the processing stage, and heated and heat-development-transferred in an adhered state. Thus, an image is obtained on the image receiving material.

In such image recording apparatus, a structure in which the inner portion of the apparatus can be opened is suitable for maintenance of the inner portion of the apparatus, e.g., replenishment of water to the water application portion (a water tank), replacement of the photosensitive material magazine, inspection of clogging (a so-called jamming) of the materials, or the like.

Regarding this point, if an inspection hole, an inspection door, or the like is simply provided at the apparatus main body, a certain degree of maintenance can be effected. However, the innermost place of the apparatus (e.g., the photosensitive material magazine disposed beneath the processing stage) cannot be exposed, and accordingly, it is difficult to inspect and maintain the apparatus sufficiently.

Further, in this case, if a large cover is provided at the apparatus main body and simply opened by a large amount, only the inner portion of the apparatus can be exposed (a state in which the cover is removed). Therefore, it is still difficult to facilitate the inspection and maintenance of the innermost place of the apparatus.

SUMMARY OF THE INVENTION

With the aforementioned in view, an object of the present invention is to provide an image recording apparatus in which the necessary place of the apparatus can be suitably exposed by simple operation and the workability of inspection, maintenance, and the like is improved.

The above-described structure is an image recording apparatus in which a photosensitive material is exposed so as to obtain a visible image, wherein: an apparatus main body is formed by a base stand and an upper cover, and the upper cover is connected to the base stand by a hinge portion so that the upper cover is able to be opened and closed; and interlocking means drives a movable part, which is provided within the apparatus main body, interlocking with the opening/closing operation of the upper cover.

In the above-described image recording apparatus, when the upper cover connected to the base stand by the hinge portion is opened, the upper portion of the interior of the apparatus main body (interior of the base stand) is exposed. When the upper cover is further opened, the interlocking means operates due to the opening/closing operation of the upper cover and the movable part provided within the apparatus main body is driven.

Accordingly, as far as the moving direction of the movable part is set appropriately (e.g., the moving direction is set in the direction in which the movable part protrudes by a large amount from the inner portion of the apparatus main body (the base stand)), the interior of the apparatus main body (the base stand) is exposed automatically by a large amount. As a result, a necessary place can be suitably exposed by simple and uncomplicated operation, and the workability of inspection, maintenance, and the like improves.

In the above-described image recording apparatus, the hinge portion includes an intermediate hinge member whose one end is rotatably supported at the base stand and whose another end is rotatably connected to the upper cover, and the upper cover is opened and closed by two stages at predetermined angles by the intermediate hinge member, and the upper cover is opened and closed around the other end of the intermediate hinge member in a first stage opened/closed state, and the upper cover is opened and closed along with the intermediate hinge member around the one end of the intermediate hinge member in a second stage opened/closed state, and the interlocking means drives the movable part interlocking with the rotation of the upper cover and the intermediate hinge member around the one end of the intermediate hinge member in the second stage opened/closed state.

In the above-described image recording apparatus, the upper cover is connected to and supported at the base stand by the intermediate hinge member of the hinge portion and the upper cover can be opened and closed by two stages at predetermined angles. In the first stage opened/closed state of the upper cover, the upper cover opens and closes around the other end (i.e., the side which is connected to the upper cover) of the intermediate hinge member. As a result, the upper portion of the interior of the apparatus main body (the base stand) is exposed. On the other hand, in the second stage opened/closed state of the upper cover, the upper cover opens and closes along with the intermediate hinge member around the one end (i.e., the side which is connected to the base stand) of the intermediate hinge member. As a result, the inner portion of the apparatus main body (the base stand) is exposed by a larger amount. In particular, in the second stage opened state, the upper cover opens around the position (i.e., the one end of the intermediate hinge member) which is different from the rotational center (i.e., the other end of the intermediate hinge member) of the upper cover in the first stage opened state. Accordingly, since the respective rotational centers are separated, the upper cover rotates at an angle larger than the rotational angle of the intermediate hinge member itself. Therefore, the inner portion of the apparatus main body (the base stand) is exposed by a large amount.

Further, in the second stage opened/closed state, the interlocking means operates due to the rotation of the upper cover and the intermediate hinge member around the one end of the intermediate hinge member and the movable part provided within the apparatus main body is driven.

Therefore, if the respective opened states are used properly, only the necessary place can be exposed suitably and automatically, such that the workability of inspection, maintenance, and the like improves.

In the above-described image recording apparatus, the movable part serves as an auxiliary bracket which is rotatably supported at the intermediate hinge member at a position which is away from the one end rotational center of the intermediate hinge member, and the displacement of one end portion of the auxiliary bracket is prevented, and a roller is mounted to another end portion of the auxiliary bracket, and the roller rotates at an angle larger than the rotational angle of the intermediate hinge member due to the rotation of the intermediate hinge member around the one end of the intermediate hinge member.

In the above-described image recording apparatus, because the auxiliary bracket is rotatably supported at the intermediate hinge member, when the intermediate hinge member rotates, i.e., in the second stage opened/closed state, the auxiliary bracket is automatically rotated due to the rotation of the intermediate hinge member.

The position at which the auxiliary bracket is supported is away from the one end rotational center of the intermediate hinge member and the displacement of the one end portion of the auxiliary bracket is prevented. Consequently, when the auxiliary bracket rotates due to the rotation of the intermediate hinge member, the roller which is mounted to the other end portion of the auxiliary bracket rotates at an angle larger than the rotational angle of the intermediate hinge member.

Accordingly, the position of the roller in the second stage opened state of the upper cover and the intermediate hinge member can be made different by a large amount from the position at which the roller is disposed at the closed state (in other words, the roller is withdrawn from the apparatus by a large amount in the second stage opened state). Thus, the workability of inspection, maintenance, and the like improves.

The above-described image recording apparatus is the image recording apparatus in which the photosensitive material is exposed, and thereafter, the photosensitive material and an image receiving material are superposed and heat-development-transferred so that a visible image is obtained on the image receiving material, and the movable part serves as a stage in which one end portion is rotatably supported at the base stand and in which the photosensitive material and the image receiving material are superposed and heat-development-transferred, and the interlocking means raises and lowers a distal end portion of the stage.

In the above-described image recording apparatus, when the intermediate hinge member rotates, i.e., in the second stage opened/closed state, the interlocking means operates due to the rotation of the intermediate hinge member and the distal end portion of the stage is raised and lowered automatically. Accordingly, in the second stage opened state, the distal end portion of the stage is raised and can be withdrawn from the apparatus by a large amount.

As a result, the innermost place of the apparatus can be exposed by simple and uncomplicated operation and the workability of inspection, maintenance, and the like improves.

In the above-described image recording apparatus, a stage lock portion engages with another end portion of the stage and holds the stage in a horizontal state, and the interlocking means drives the stage lock portion interlocking with the rotation of the upper cover and the intermediate hinge member around the one end of the intermediate hinge member in the second stage opened/closed state so as to release the holding state.

In the above-described image recording apparatus, in the second stage opened state, i.e., when the intermediate hinge member rotates, the interlocking means operates, the stage lock portion is driven and the holding state of the stage is automatically released. Accordingly, the stage is raised and the innermost place of the apparatus can be exposed by simple and uncomplicated operation. The workability of inspection, maintenance, and the like thereby improves.

In the above-described image recording apparatus, the timing of the interlocking means is determined so that the stage lock portion is driven, the holding state is released, and thereafter, the other end portion of the stage is raised.

In the above-described image recording apparatus, the interlocking means operates such that the timing in which the stage lock portion is driven and the holding state of the stage is released is made different from the timing in which the other end portion of the stage is raised. Accordingly, these respective operations can be carried out as a continuous chain of operations.

In the above-described image recording apparatus, a photosensitive material magazine winds and accommodates the photosensitive material in a roll-form, and the movable part serves as a holder for holding the photosensitive material magazine, and the interlocking means drives the holder in a direction in which the holding of the photosensitive material magazine is released.

In the above-described image recording apparatus, when the intermediate hinge member rotates, i.e., in the second stage opened/closed state, the interlocking means operates due to the rotation of the intermediate hinge member, and the holder which holds the photosensitive material magazine is driven automatically in the direction in which the photosensitive material magazine is released. Accordingly, in the second stage opened state, the photosensitive material magazine can be easily removed and replaced as it is, such that the workability of inspection, maintenance, and the like improves.

BRIEF DESCRIPTION OF THE DRAWINGS

FIG. 1 is a perspective view of an overall structure of an image recording apparatus relating to a present embodiment in a state in which an upper cover is fully opened.

FIG. 13 is a cross-sectional view which, seen from the side, shows respective parts of the hinge portion in the image recording apparatus relating to the present embodiment in a state in which the upper cover is fully opened.

FIG. 14 is a perspective view which shows a retention release mechanism of a supply magazine in the image recording apparatus relating to the present embodiment.

FIG. 19 is a side view which shows a structure of the stage lock portion in the image recording apparatus relating to the present embodiment.

DETAILED DESCRIPTION OF THE PREFERRED EMBODIMENTS

Figure 2:
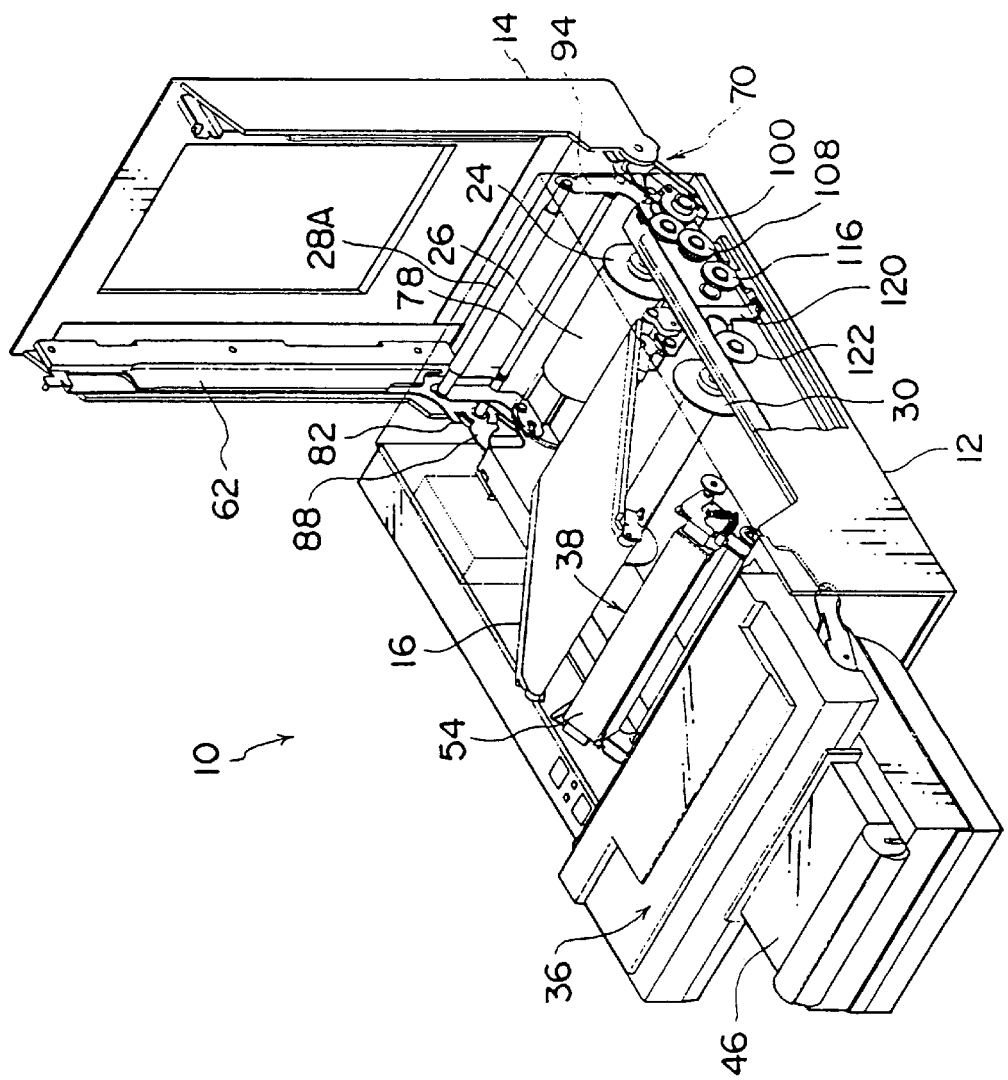
FIG. 2 is a perspective view of an overall structure of the image recording apparatus relating to the present embodiment in a state in which the upper cover is fully opened.
Figure 3:
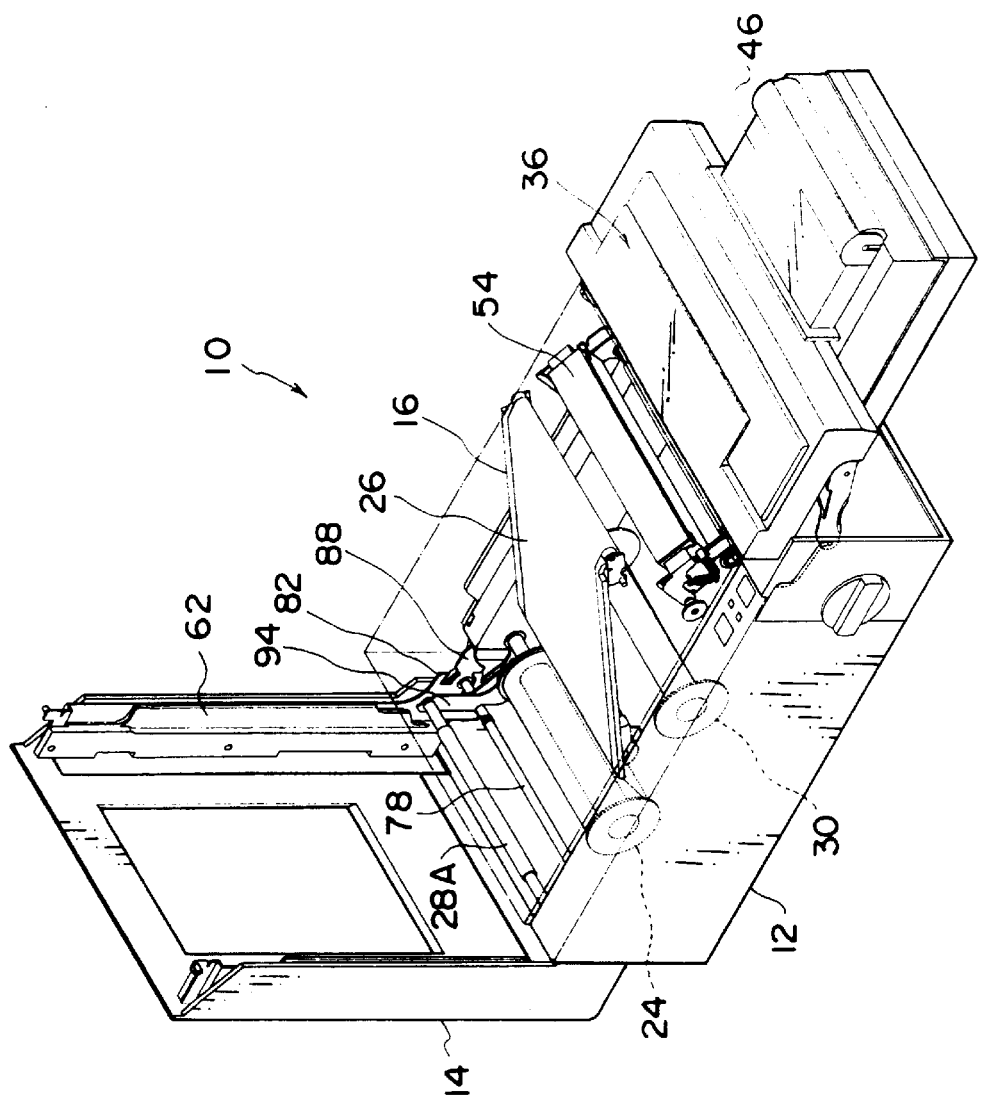
FIG. 3 is a perspective view of an overall structure of the image recording apparatus relating to the present embodiment in a state in which the upper cover is fully opened.
Figure 8:
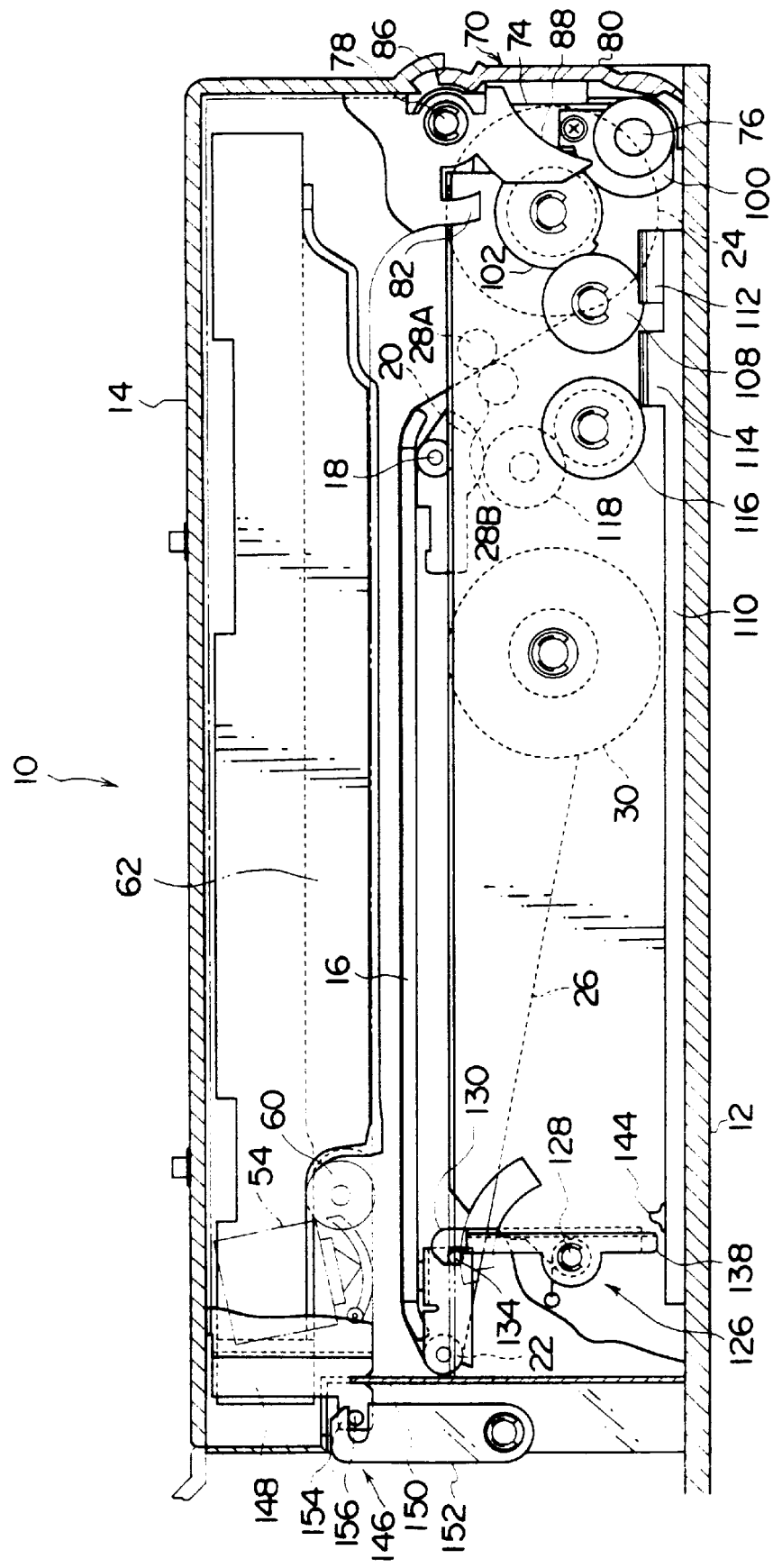
FIG. 8 is a cross-sectional view which, seen from the side, shows a corresponding relationship between a hinge portion, a stage, a stage lock portion, and the like in the image recording apparatus relating to the present embodiment.

FIGS. 1 through 3 is a perspective view showing an overall structure of an image recording apparatus 10 relating to the present embodiment. FIGS. 4 through 7 is a cross-sectional view which, seen from the side, shows the overall structure of the image recording apparatus 10. Further, FIG. 8 is a cross-sectional view which, seen from the side, shows a structure of principal parts of the image recording apparatus 10.

The image recording apparatus 10 is formed box-shaped by a base stand 12 and an upper cover 14. One end side (the right end side on each of the page surfaces in FIGS. 4 through 8) of the upper cover 14 is connected to and supported at the base stand 12 by a hinge portion 70, which will be described later, such that the upper cover 14 can be opened and closed with respect to the base stand 12. Further, a lock portion 146, which will be also described later, is provided at the base stand 12 and another end side (the side opposite the hinge portion 70) of the upper cover 14, such that the upper cover 14 is usually held in a closed state.

On the other hand, a stage 16 is provided at the inner central portion of the base stand 12. The stage 16 is a flat heat plate and one end portion (the hinge portion 70 side) of the stage 16 is rotatably supported by a supporting shaft 18. A lifting gear 20, which is coaxial with the supporting shaft 18, is integrally mounted to the stage 16, and the stage 16 is rotatable around the supporting shaft 18 (the other end side of the stage 16 is lifted) by rotating the lifting gear 20. Further, a free roller 22 is mounted to the other end portion of the stage 16. The stage 16 is connected to the hinge portion 70, to be described later, via a driving mechanism and is rotated around the supporting shaft 18 in accordance with the opening/closing movement of the hinge portion 70. Moreover, a stage lock portion 126, which will be also described later, is provided at the base stand 12 corresponding to the other end portion of the stage 16 such that the other end portion of the stage 16 is usually held in a horizontal state.

Further, in the base stand 12, a supply magazine 24 is provided beneath the one end side (the hinge portion 70 side) of the stage 16. A photosensitive material 26 serving as an image recording material is wound in a roll-form and accommodated within the supply magazine 24. The photosensitive material 26 is formed by having, on a substrate, a photosensitive silver halide, a binder, a dye providing substance and a reducing agent. In a state in which the photosensitive material 26 is withdrawn from the supply magazine 24 and held horizontally on the stage 16, the photosensitive surface thereof faces upward.

A pair of withdrawing rollers 28A, 28B are disposed between the supply magazine 24 and the stage 16. The withdrawing rollers 28A, 28B serve as nip rollers, and the photosensitive material 26 can be withdrawn from the supply magazine 24. The upper withdrawing roller 28A of the withdrawing rollers 28A, 28B interlocks with the hinge portion 70, which will be described later, and is movable in the nip releasing direction.

Further, a take-up magazine 30 is provided below the stage 16 near the above-described supply magazine 24. The photosensitive material 26 which is withdrawn from the supply magazine 24 and extends across the stage 16 from one end to the other end (the free roller 22) is taken up onto the take-up magazine 30. A predetermined length of the photosensitive material 26 is withdrawn and placed on the stage 16.

Figure 4:
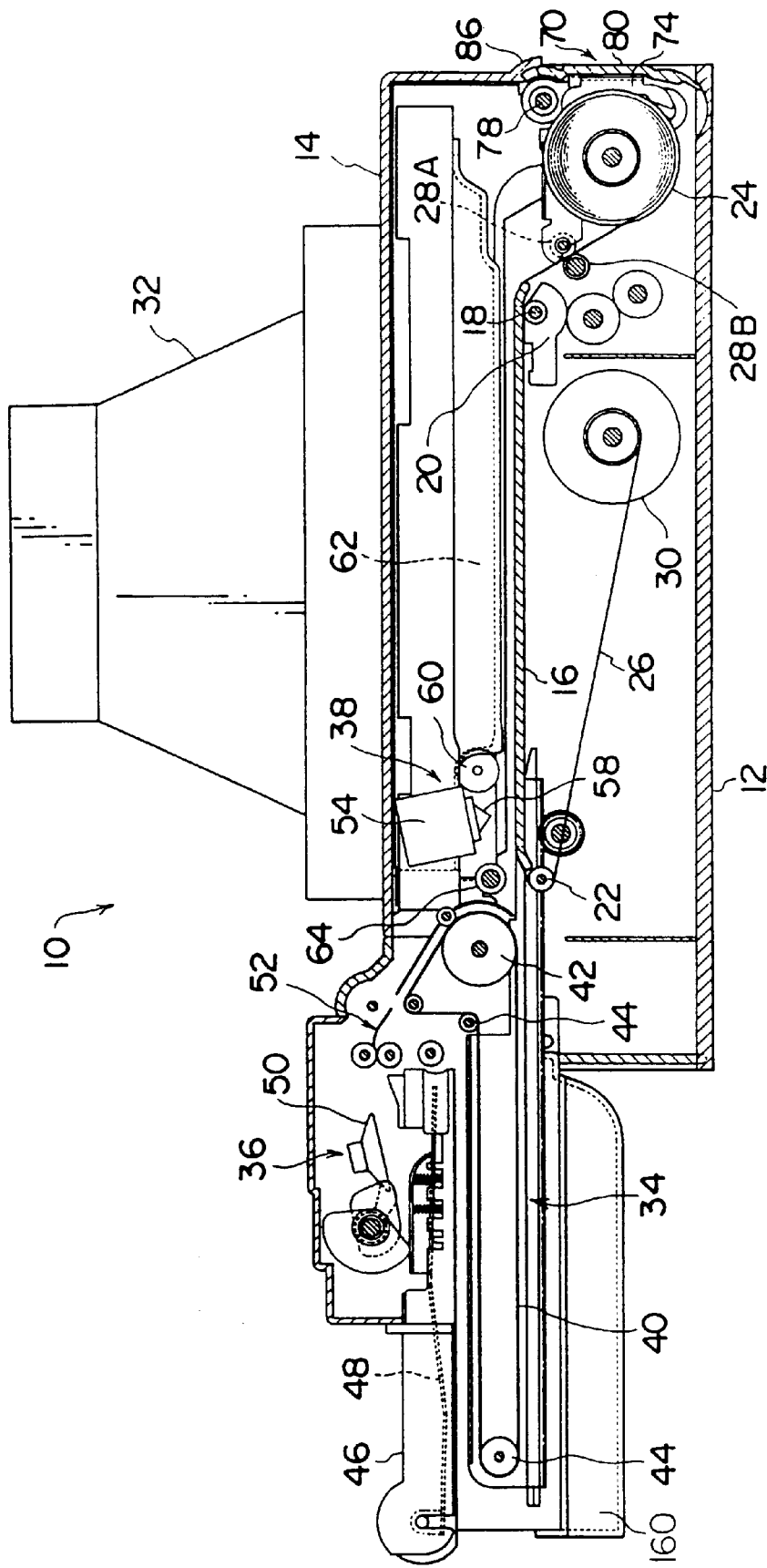
FIG. 4 is a cross-sectional view which, seen from the side, shows an overall structure of the image recording apparatus relating to the present embodiment.
Figure 5:
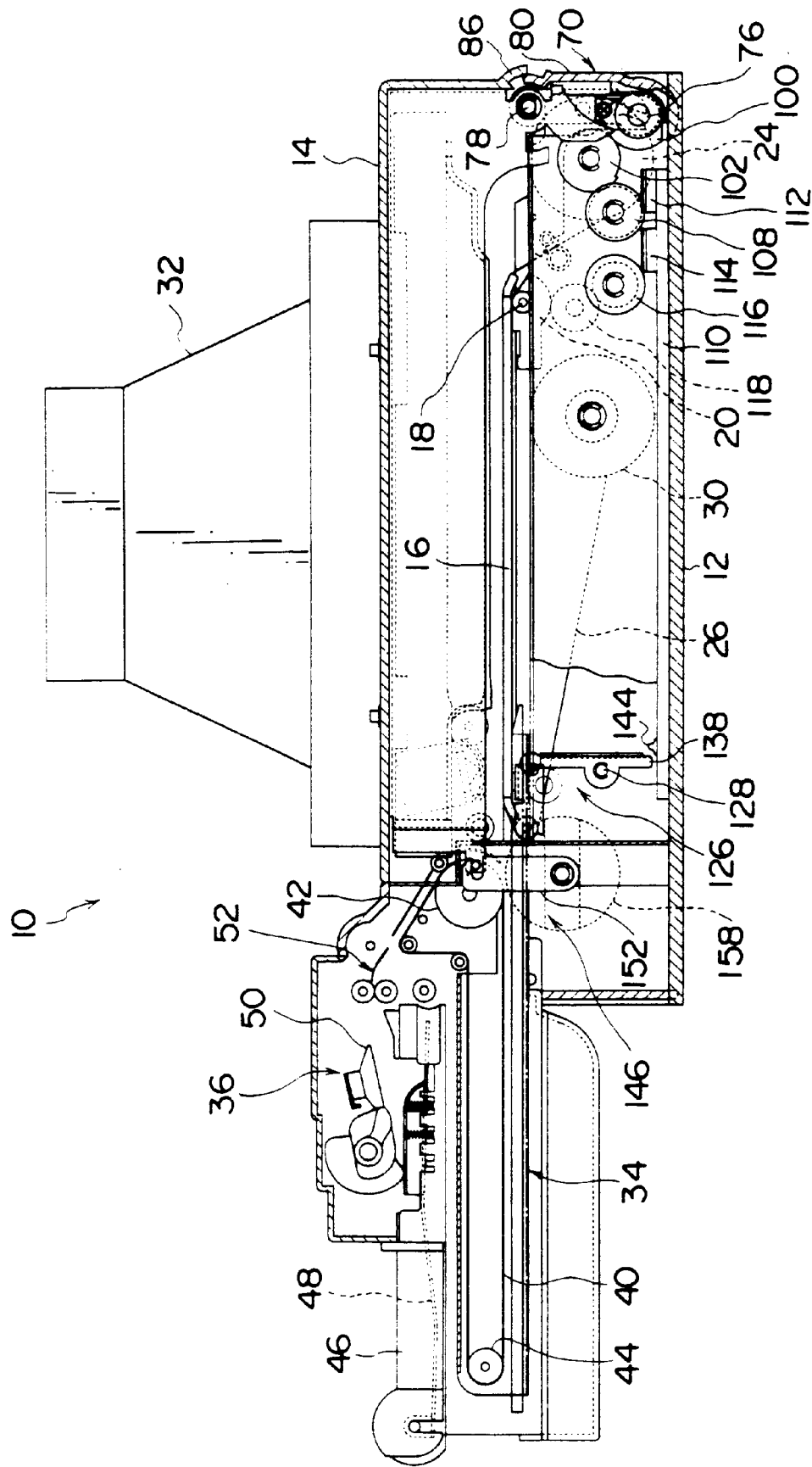
FIG. 5 is a cross-sectional view which, seen from the side, shows an overall structure of the image recording apparatus relating to the present embodiment.

On the other hand, an exposure unit 32 is provided above the base stand 12 so as to oppose the stage 16 (the exposure unit 32 is illustrated only in FIGS. 4 and 5 and not illustrated in the other drawings). The exposure unit 32 includes a light source (unillustrated) and light, which has been illuminated onto a document, is exposed onto the photosensitive material 26 placed on the stage 16. An image on the document may be successively scan-exposed onto the photosensitive material 26 while the light source is moved along the document.

Further, the image recording apparatus 10 includes an attaching unit 34, a paper feeding portion 36, and a water application portion 38.

In the attaching unit 34, an endless belt 40 extends over an attaching roller 42 and a plurality of winding rollers 44. The attaching unit 34 can successively moved on the stage 16 from a standby position (the position at the left end portion of the base stand 12 shown in FIGS. 4 and 5) to the distal end portion of the stage 16 (the right end portion in FIGS. 4 and 5). As the attaching unit 34 advances, the endless belt 40 travels on the stage 16 so as to correspond to the advancement of the attaching unit 34 (the endless belt 40 travels clockwisely in FIGS. 4 and 5).

The paper feeding portion 36 is provided directly above the attaching unit 34 disposed at the standby position (the left end portion of the base stand 12 in FIGS. 4 and 5). An image receiving material magazine 46 is loaded into the paper feeding portion 36, and further, an image receiving material 48 is cut to predetermined lengths and superposed in the image receiving material magazine 46. The image receiving material 48 is accommodated parallel to the stage 16. A dye-fixing material having mordant is applied to one surface of the image receiving material 48 so as to form an image forming surface, and the image forming surface is accommodated within the image receiving material magazine 46 in a state in which the image forming surface faces upward.

Further, in the paper feeding portion 36, a suction disk 50 is provided at the distal end portion upper side of the image receiving material magazine 46 and a guide portion 52 is provided so as to correspond to the attaching roller 42 of the attaching unit 34 disposed at the standby position.

As the attaching unit 34 (the endless belt 40) travels, the image receiving material 48 within the image receiving material magazine 46 is sucked and taken out by the suction disk 50 and is conveyed to the attaching roller 42 (the outer periphery of the endless belt 40) of the attaching unit 34 disposed at the standby position via the guide portion 52. Further, the image receiving material 48 which has been conveyed to the attaching roller 42 (the outer periphery of the endless belt 40) of the attaching unit 34 disposed at the standby position is reversely rotated by moving along with the endless belt 40 and the withdrawing end of the image receiving material 48 abuts the photosensitive material 26. Then, as the attaching unit 34 moves, the image receiving material 48 is nipped between the endless belt 40 and the photosensitive material 26 such that the image receiving material 48 is successively superposed on the photosensitive material 26.

On the other hand, the water application portion 38 includes a tank 54. The tank 54 is formed in the shape of an elongated rectangular box and is disposed along the transverse direction of the stage 16 (the directions orthogonal to the page surfaces in FIGS. 4 and 5). The tank 54 is supported at the aforementioned attaching unit 34 by a supporting arm 56 so as to be movable in the vertical directions of the apparatus. As a result, the tank 54 and the attaching unit 34 successively move along the stage 16. Auxiliary agent of transfer (solvent for image formation) such as water is filled in the tank 54. Moreover, a sponge 58 is attached to the bottom portion of the tank 54. The sponge 58 can absorb and hold the water within the tank 54.

Further, a guide wheel 60 is provided at the water application portion 38. The guide wheel 60 corresponds to a guide rail 62 having steps provided at the base stand 12 (the upper cover 14) and moves along the guide rail 62. As the guide wheel 60 moves along the guide rail 62, the tank 54 is guided in the vertical directions of the apparatus and the sponge 58 is raised and lowered in accordance with the raising and lowering of the tank 54.

The dimensions of respective parts and the like are determined such that the sponge 58 separates from the photosensitive material 26 on the stage 16 at the raised position of the tank 54 and that the sponge 58 contacts the photosensitive material 26 on the stage 16 at the lowered position of the tank 54. In a state in which the sponge 58 is pressed so as to contact the photosensitive material 26, the sponge 58 is compressed and water is discharged from the sponge 58 to the photosensitive material 26. Further, as the water application portion 38 (the sponge 58) advances in this state, water is successively applied to the photosensitive material 26.

Moreover, a squeeze roller 64 is disposed at the reverse side of the tank 54 (the side opposite the guide wheel 60). The squeeze roller 64 is moved along with the tank 54 (the sponge 58) and can remove excess water applied to the photosensitive material 26.

After the image on the document is exposed onto the photosensitive material 26, the image receiving material 48 is supplied from the above paper feeding portion 36. Then, water is applied to the photosensitive material 26 by the water application portion 38, and the image receiving material 48 and the photosensitive material 26 are attached by the attaching unit 34. Thereafter, heat development transfer is carried out on the stage 16 in a state in which the image receiving material 48 and the photosensitive material 26 are superposed. Namely, movable dyes are discharged from the photosensitive material 26 and simultaneously transferred onto a dye fixing layer of the image receiving material 48 such that an image is obtained on the image receiving material 48.

Here, a detailed description is given of the hinge portion 70 and the lock portion 146 which connect and support the aforementioned upper cover 14 at the base stand 12 such that the upper cover 14 can be opened and closed.

Figure 9:
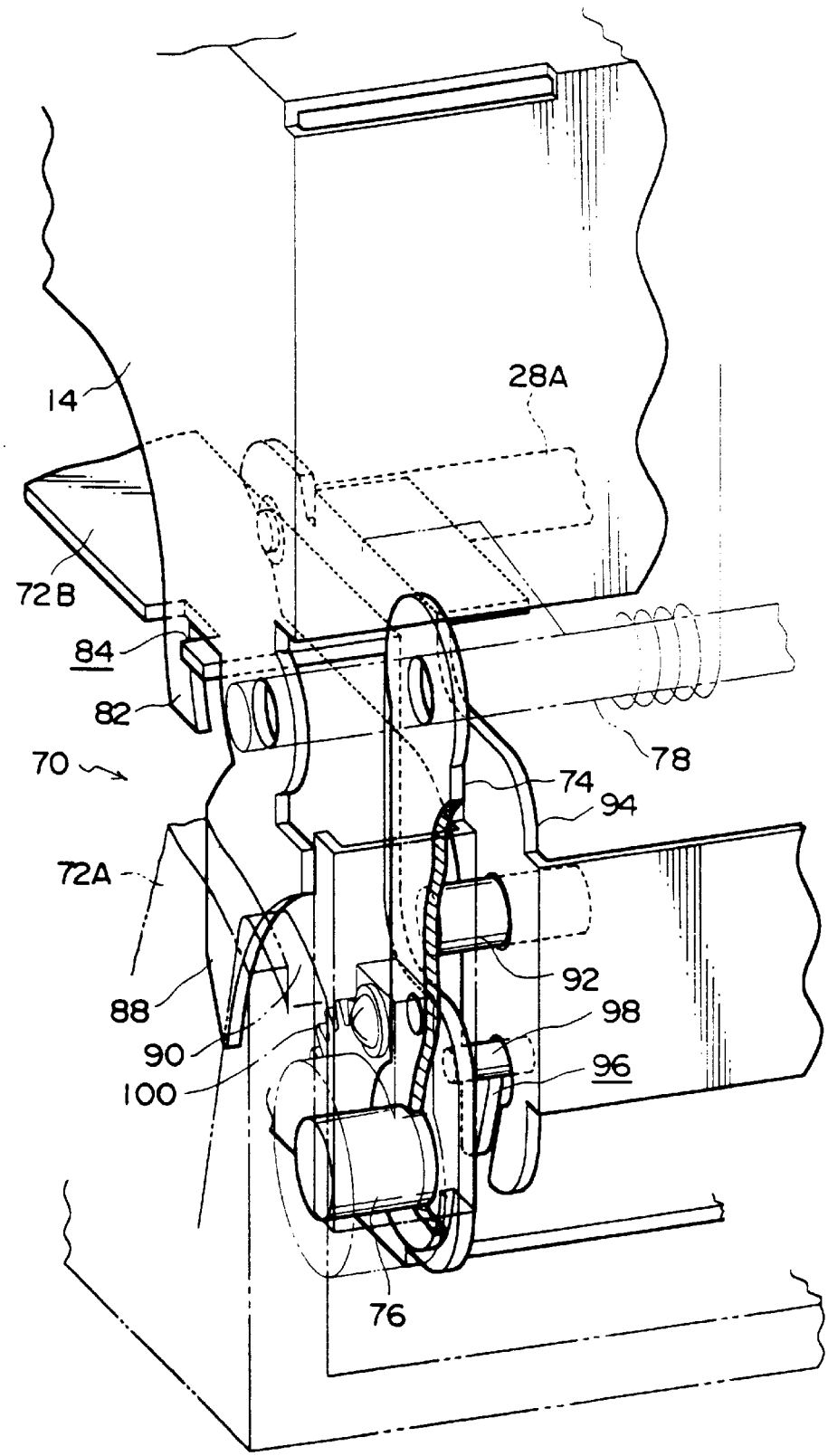
FIG. 9 is a perspective and broken view of a part of the hinge portion in the image recording apparatus relating to the present embodiment.
Figure 10:
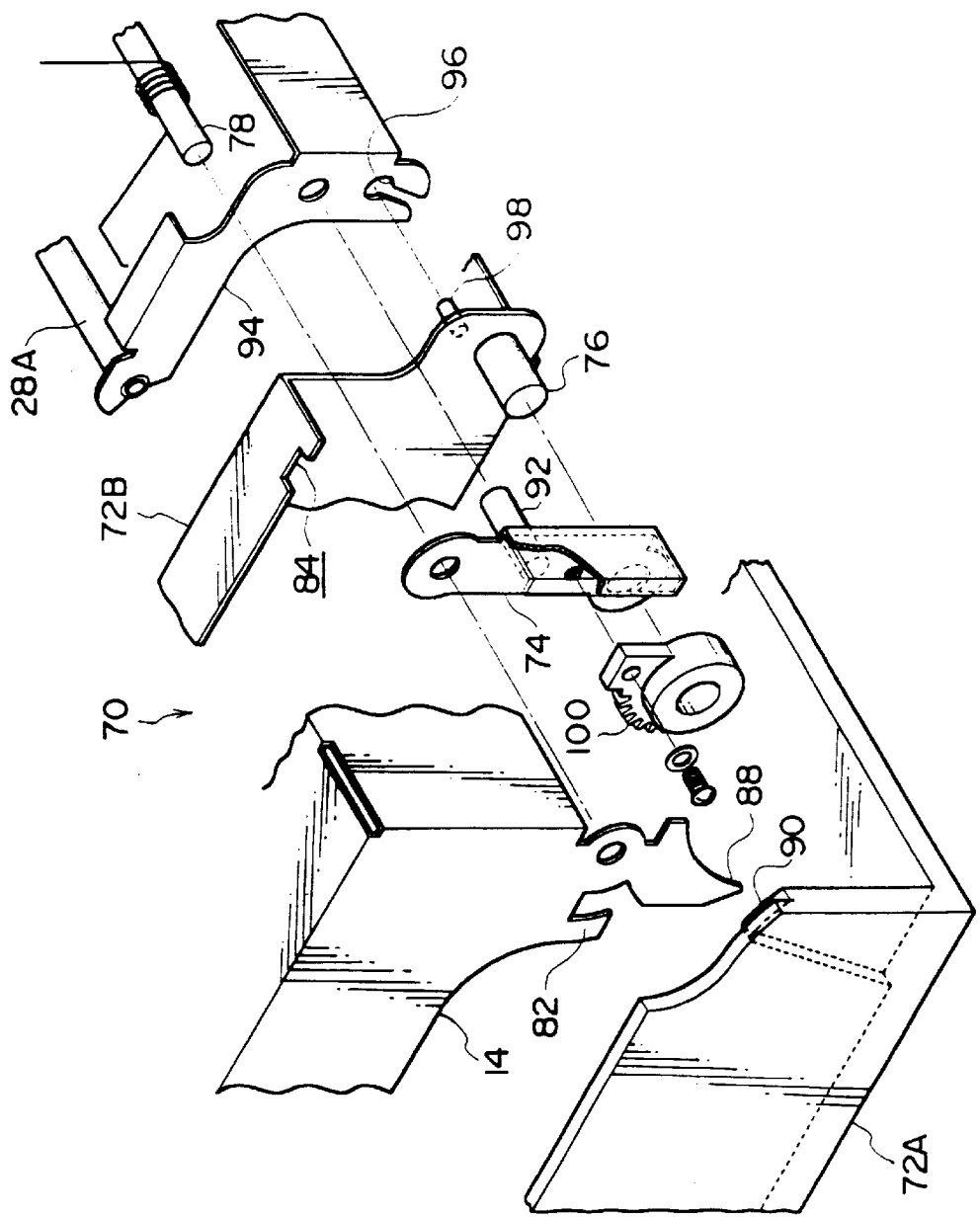
FIG. 10 is a perspective and exploded view of respective parts of the hinge portion in the image recording apparatus relating to the present embodiment.
Figure 11:
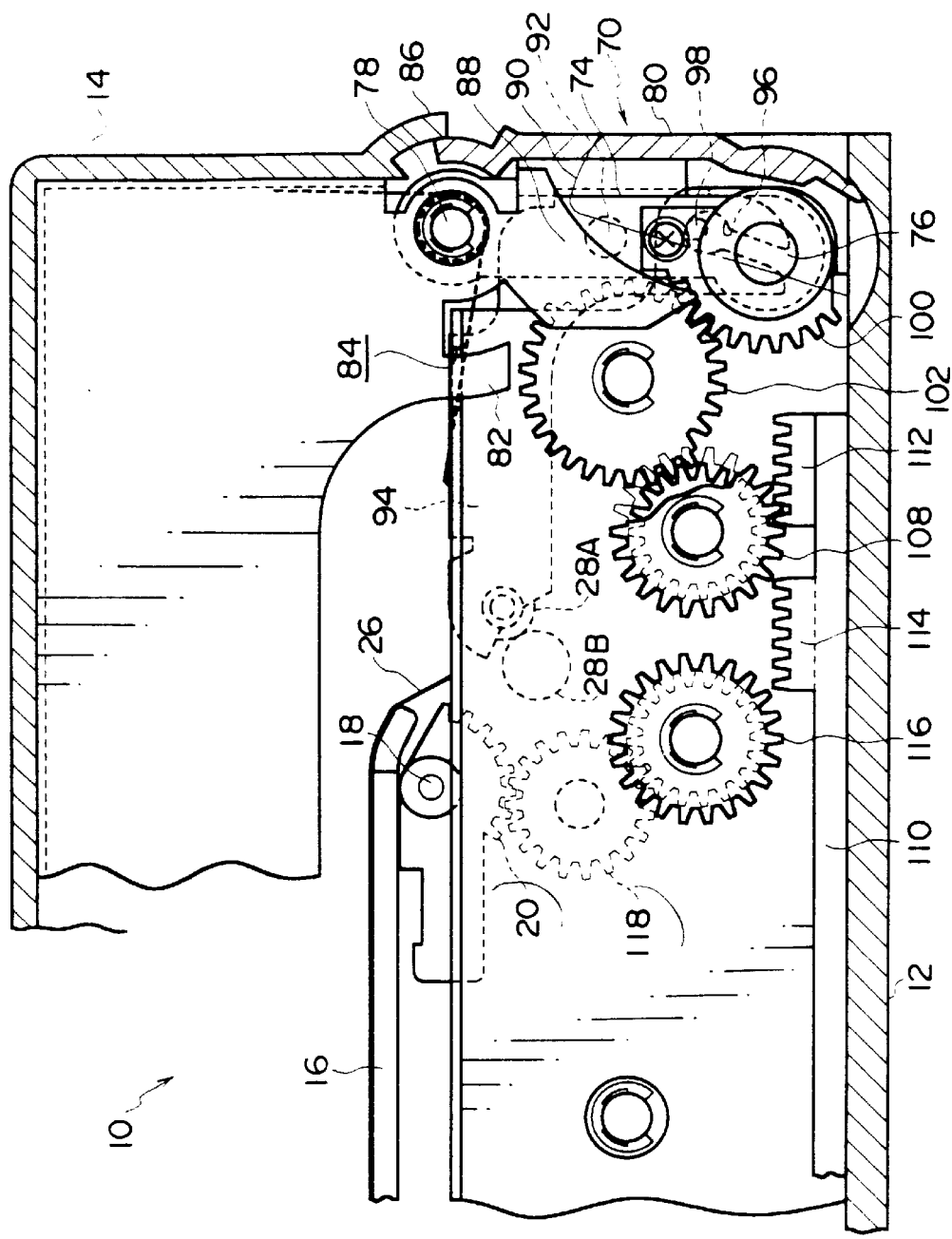
FIG. 11 is a cross-sectional view which, seen from the side, shows respective parts of the hinge portion in the image recording apparatus relating to the present embodiment in a state in which the upper cover is fully closed.
Figure 12:
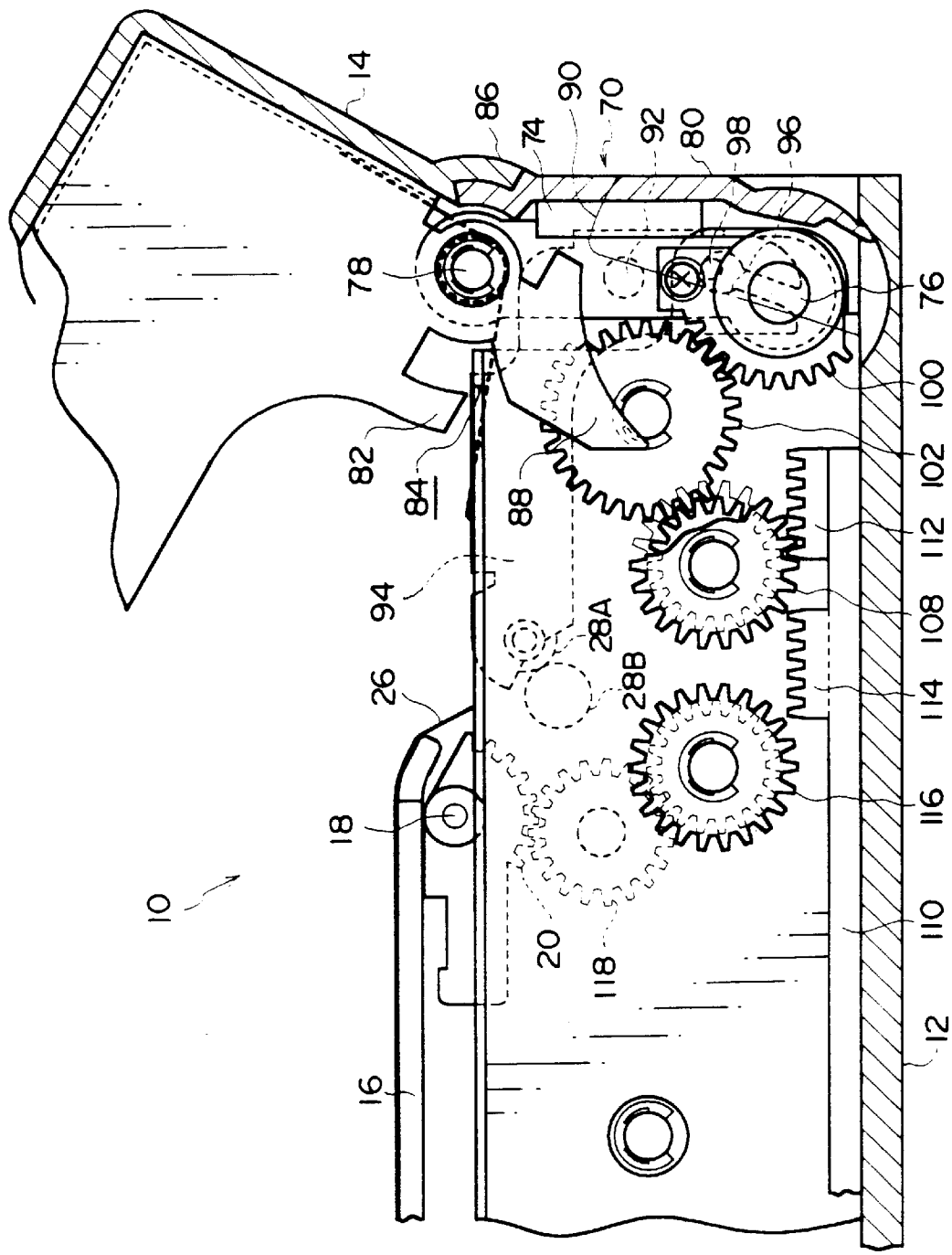
FIG. 12 is a cross-sectional view which, seen from the side, shows respective parts of the hinge portion in the image recording apparatus relating to the present embodiment in a state in which the upper cover is opened by one stage.

FIG. 9 is a perspective and broken view of a part of the hinge portion 70. FIG. 10 is a perspective and exploded view of respective parts of the hinge portion 70. FIGS. 11 through 13 is a cross-sectional view which, seen from the side, shows respective parts of the hinge portion 70.

In the hinge portion 70, a substrate 72B which forms a portion of the base stand 12 is integrally fixed to a substrate 72A, and further, an intermediate hinge 74 is mounted to the substrate 72B. One end portion of the intermediate hinge 74 is rotatably supported by a supporting shaft 76 which protrudes from the substrate 72B. On the other hand, the aforementioned upper cover 14 is rotatably supported at another end portion of the intermediate hinge 74 by a supporting shaft 78. In this way, the upper cover 14 is supported at the base stand 12 (the substrate 72A and the substrate 72B) via the intermediate hinge 74.

An auxiliary cover 80 is mounted to the apparatus outer side surface of the intermediate hinge 74 so as to coat the side surface of the base stand 12. The auxiliary cover 80 invariably rotates integrally with the intermediate hinge 74.

A pawl portion 82 is formed at the corner portion of the upper cover 14. When the upper cover 14 rotates around the supporting shaft 78, the pawl portion 82 can be inserted through an engagement hole 84 formed at the substrate 72B. In a state in which the pawl portion 82 is inserted through the engagement hole 84, the rotation of the intermediate hinge 74 around the supporting shaft 76 is prevented. Namely, as shown in FIG. 11, in a state in which the upper cover 14 is closed, the pawl portion 82 is inserted through the engagement hole 84. A state in which the pawl portion 82 is inserted through the engagement hole 84, the rotation of the intermediate hinge 74 around the supporting shaft 76 is prevented, and only the upper cover 14 is rotatable around the supporting shaft 78 is a first stage opened/closed state (the states shown in FIGS. 11 and 12). Further, a state in which the opening movement of the upper cover 14 progresses, the pawl portion 82 is removed from the engagement hole 84, and thereafter, the intermediate hinge 74 is rotatable around the supporting shaft 76 is a second stage opened/closed state.

Moreover, when the opening movement of the upper cover 14 progresses and the pawl portion 82 is removed from the engagement hole 84, a slide engaging portion 86 provided at the back surface distal end of the upper cover 14 engages with the upper end portion of the auxiliary cover 80 and further rotation of the upper cover 14 is prevented.

Further, a pawl portion 88 is formed at the upper cover 14 in the vicinity of the pawl portion 82. The distal end of the pawl portion 88 is formed in the shape of an arc and can be engaged with an engaging convex portion 90 provided at the substrate 72A. Namely, in a state in which the pawl portion 82 is inserted through the engagement hole 84, the rotation of the intermediate hinge 74 around the supporting shaft 76 is prevented, and only the upper cover 14 is rotatable around the supporting shaft 78 (the first stage opened/closed state), the pawl portion 88 separates from the engaging convex portion 90. Further, after the upper cover 14 rotates around the supporting shaft 78 and the pawl portion 82 is removed from the engagement hole 84 (i.e., at the time of second stage opened/closed state), the pawl portion 88 moves along the engaging convex portion 90. In this way, in the second stage opened/closed state, as mentioned hereinbefore, the pawl portion 82 is removed from the engagement hole 84, the intermediate hinge 74 is rotatable around the supporting shaft 76, and the rotation of the upper cover 14 around the supporting shaft 78 is prevented. Accordingly, in the second stage opened/closed state, the upper cover 14 rotates integrally with the intermediate hinge 74 around the supporting shaft 76.

In the present embodiment, the dimensions of respective parts and the like are determined such that the angle which is defined by the upper cover 14 in the closed state thereof and the upper cover 14 in the state in which the pawl portion 82 is removed from the engagement hole 84 (i.e., the first stage opened/closed state) is 30 degrees and that the angle which is defined by the upper cover 14 in the first stage opened/closed state and the upper cover 14 in the state in which the upper cover 14 and the intermediate hinge 74 are fully opened (the second stage opened/closed state) is 60 degrees.

An auxiliary bracket 94 is rotatably mounted to the central portion of the intermediate hinge 74 (i.e., the position which is away from the supporting shaft 76 serving as the rotational center of the intermediate hinge 74) by the supporting shaft 92. The auxiliary bracket 94 is formed so as to be bent in the shape of an L, when viewed from the side, and a U-shaped notch portion 96 is formed at one end portion thereof. A stationary pin 98 which protrudes from the substrate 72B is rotatably inserted through the notch portion 96. As a result, the displacement of the end portion of the auxiliary bracket 94 at the notch portion 96 side is prevented.

The aforementioned withdrawing roller 28A is mounted to another end portion (the end portion at the side opposite the notch portion 96) of the auxiliary bracket 94. In a state in which the upper cover 14 and the intermediate hinge 74 are closed, the withdrawing roller 28A holds the photosensitive material 26 withdrawn from the supply magazine 24 as mentioned before. However, the auxiliary bracket 94 is rotated due to the rotation of the intermediate hinge 74 around the supporting shaft 76, the withdrawing roller 28A separates from the withdrawing roller 28B so as to release the holding of the photosensitive material 26.

Further, in this case, the position at which the auxiliary bracket 94 is supported (i.e., the supporting shaft 92) is away from the one end rotational center of the intermediate hinge 74 (the supporting shaft 76), and the displacement of the one end portion (the end portion at the notch portion 96 side) of the auxiliary bracket 94 is prevented. Consequently, when the auxiliary bracket 94 is rotated due to the rotation of the intermediate hinge 74, the other end portion of the auxiliary bracket 94 (i.e., the withdrawing roller 28A) rotates at an angle larger than the rotational angle of the intermediate hinge 74. In the present embodiment, when the intermediate hinge 74 is rotated by 60 degrees (i.e., the state in which the upper cover 14 is fully opened), the dimensions of respective parts are determined such that the withdrawning roller 28A is rotated by 90 degrees from the initial position.

Furthermore, a gear 100 which forms interlocking means is mounted to the intermediate hinge 74. The gear 100 is fixed coaxially with the supporting shaft 76, and accordingly, the gear 100 interlocks with the rotation of the intermediate hinge 74.

An intermediate gear 102, which is mounted to the substrate 72A and forms interlocking means in the same way, engages with the gear 100. As a result, when the intermediate hinge 74 rotates, the intermediate gear 102 is rotated accordingly. The intermediate gear 102 is connected to a holder 104 of the aforementioned supply magazine 24. As shown in FIG. 14, a feed screw 106 is integrally fixed at and connected to the intermediate gear 102, and further, the holder 104 whose rotation is prevented is screwed to the feed screw 106. Namely, when the intermediate gear 102 rotates, the holder 104 moves along the feed screw 106 in the axial direction. The holder 104 is formed in the shape of a truncated cone and engages the axial direction end portion of the supply magazine 24 so as to be able to hold the supply magazine 24. Also, the above-described holding can be released by moving the holder 104 in the axial direction (the direction of approaching to the intermediate gear 102). In this way, the supply magazine 24 can be loaded and replaced.

Moreover, an intermediate gear 108, which is mounted to the substrate 72A and forms interlocking means, engages with the intermediate gear 102, and further, a first rack 112, which also forms interlocking means, of a slide lever 110 engages with the intermediate gear 108. Consequently, when the intermediate hinge 74 rotates, the slide lever 110 is slid in the axial direction accordingly.

A second rack 114 is formed in the vicinity of the first rack 112 of the slide lever 110. Intermediate gears 116, 118, which are mounted to the substrate 72A and form interlocking means, successively engage with the second rack 114. Further, the intermediate gear 118 engages with the lifting gear 20 of the aforementioned stage 16. As a result, when the slide lever 110 moves, driving force is transmitted to the lifting gear 20, the lifting gear 20, i.e., the stage 16, rotates around the supporting shaft 18, and the distal end portion (the free roller 22 side) of the stage 16 is lifted.

In the present embodiment, in a state in which the slide lever 110 is fully moved (in other words, a state in which the intermediate hinge 74 rotates by 60 degrees), i.e., in a state in which the upper cover 14 is fully opened, the gear ratios, the dimensions of respective parts, and the like are determined so that the stage 16 is raised by 60 degrees.

Figure 15:
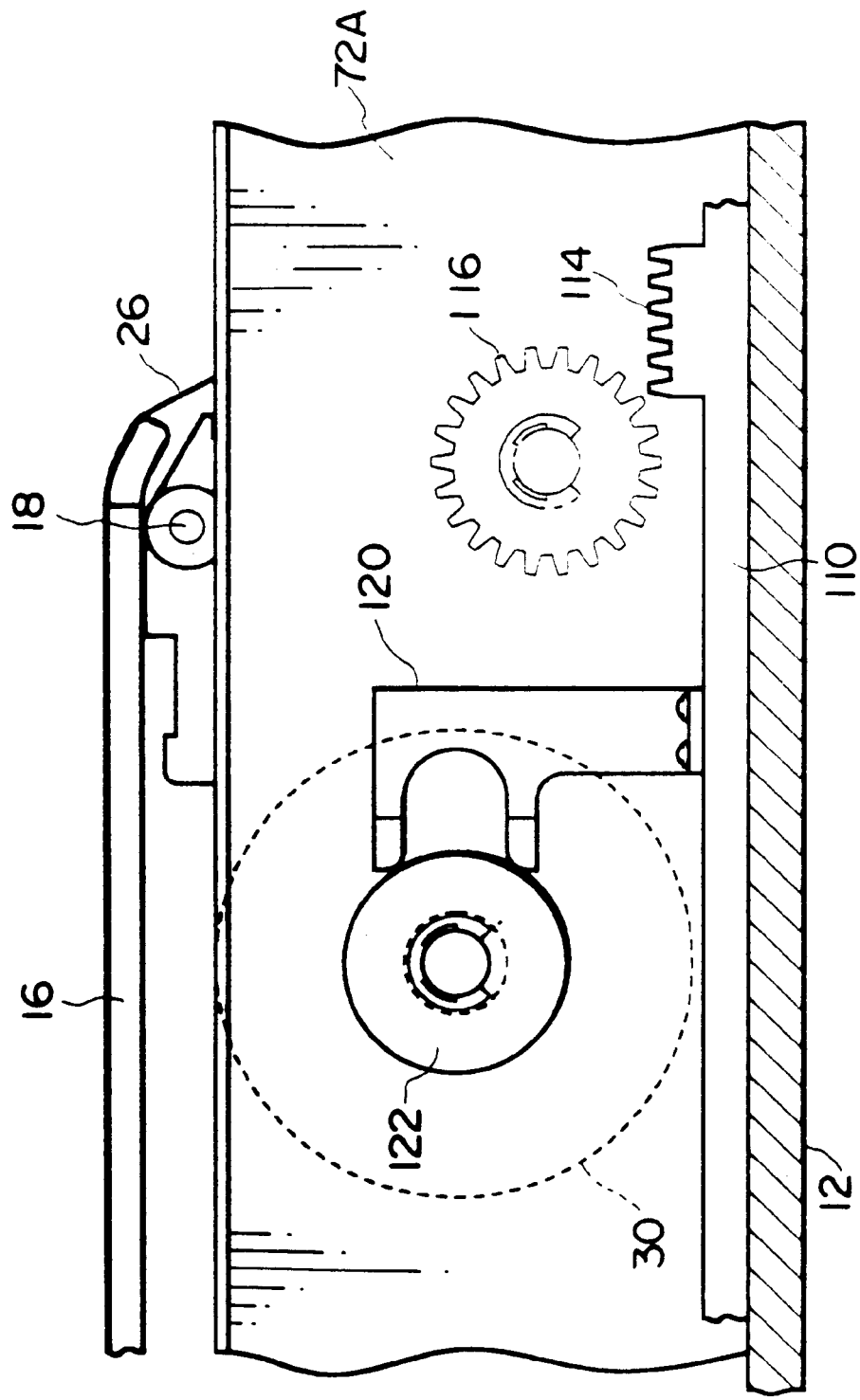
FIG. 15 is a side view which shows the retention release mechanism of the supply magazine in the image recording apparatus relating to the present embodiment.
Figure 16:
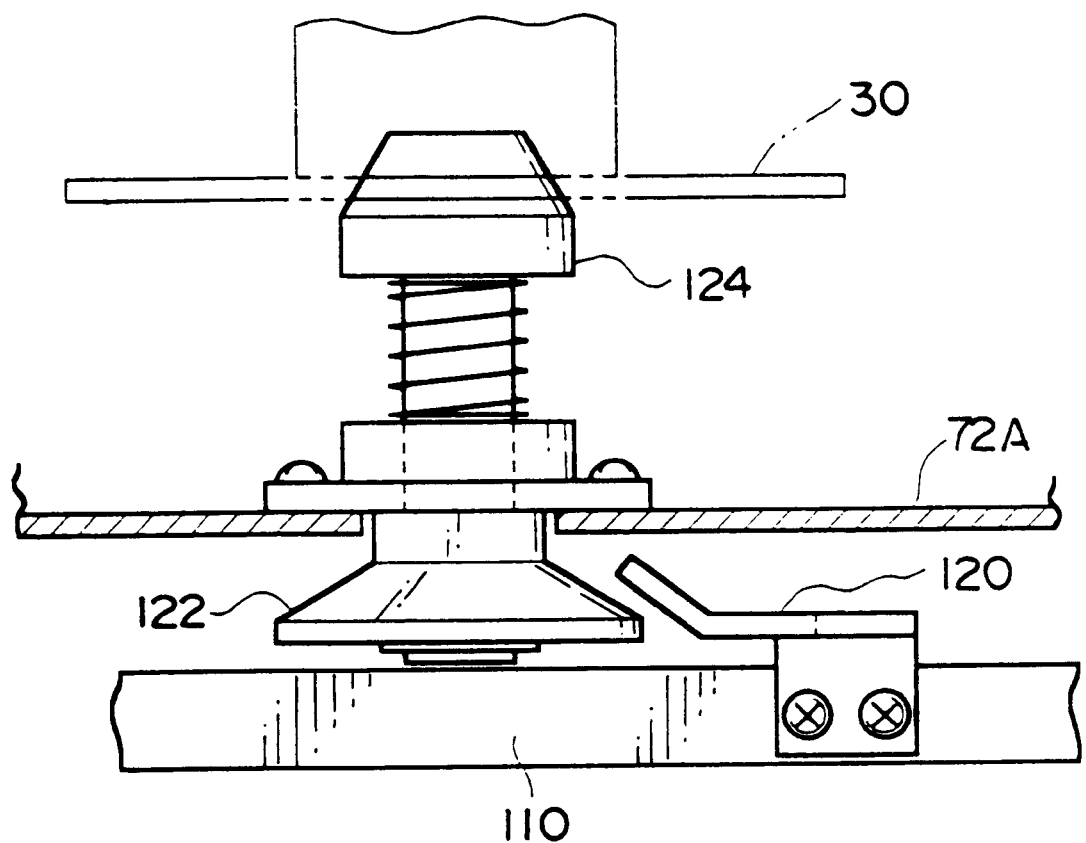
FIG. 16 is a plan view which shows the retention release mechanism of the supply magazine in the image recording apparatus relating to the present embodiment.
Figure 17:
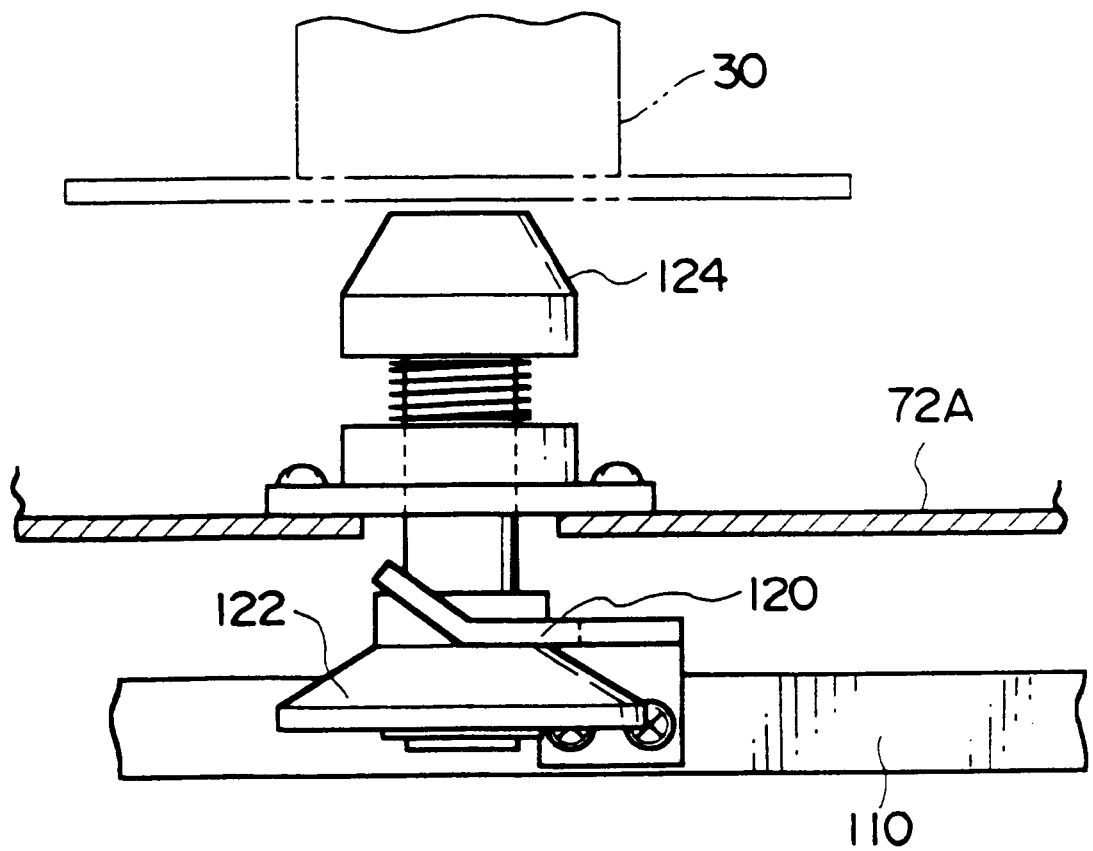
FIG. 17 is a plan view which shows the retention release mechanism of the supply magazine in the image recording apparatus relating to the present embodiment in a state in which the supply magazine is released.

Further, the slide lever 110 is disposed along the substrate 72A and a withdrawing arm 120 is mounted to the longitudinal direction intermediate portion thereof. As shown in FIG. 15, the distal end portion of the withdrawing arm 120 is U-shaped and can be engaged with a cam 122. As shown in FIGS. 16 and 17, the cam 122 is formed in the shape of a truncated cone and connected to a holder 124 of the aforementioned take-up magazine 30. Namely, when the slide lever 110 moves, the withdrawing arm 120 presses the cam 122 such that the cam 122 and the holder 124 move in the axial direction. In this way, the take-up magazine 30 can be replaced.

The distal end of the slide lever 110 provided along the substrate 72A reaches the stage lock portion 126 of the aforementioned stage 16.

Figure 18:
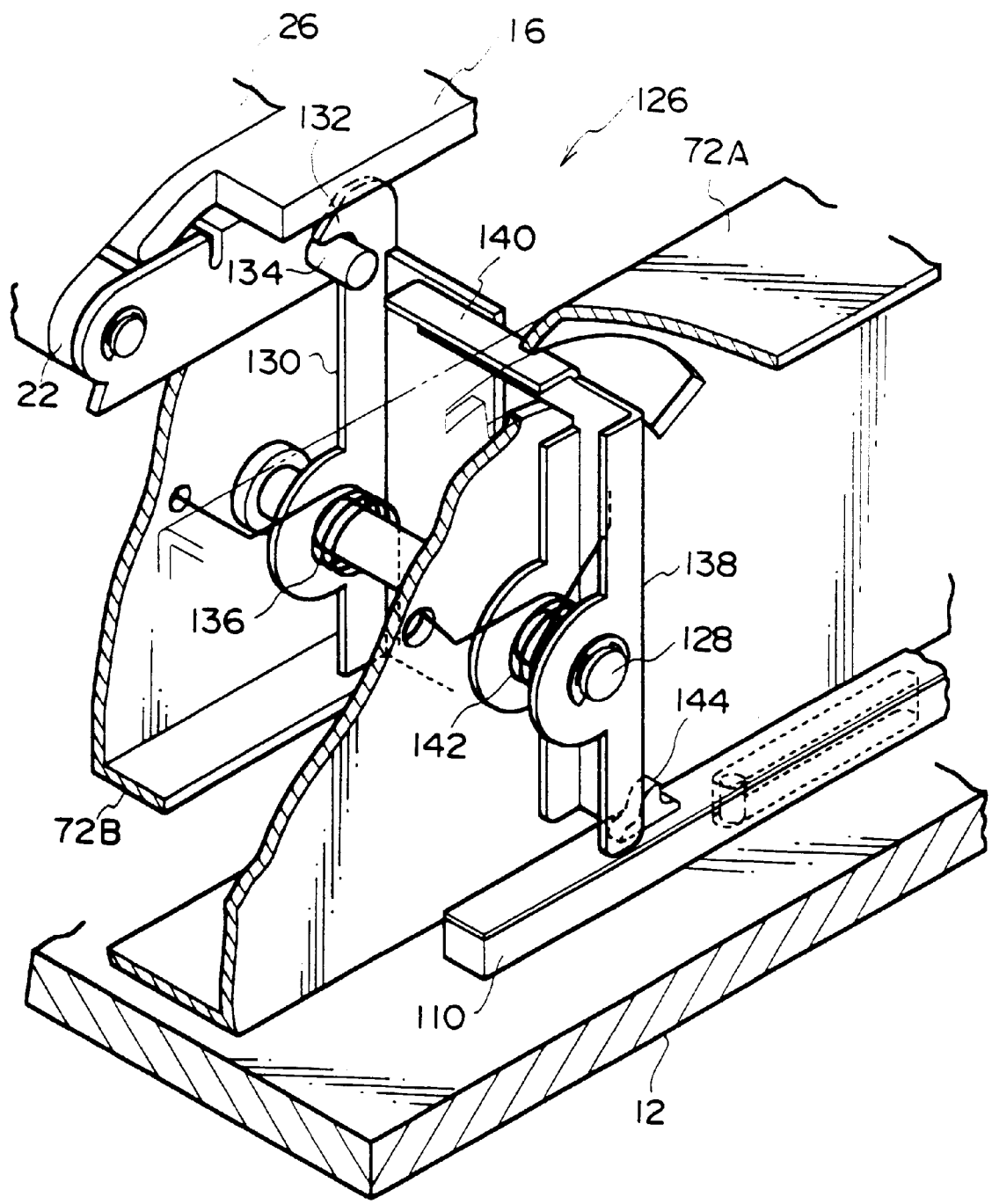
FIG. 18 is a perspective view which shows a structure of the stage lock portion in the image recording apparatus relating to the present embodiment.

FIG. 18 is a perspective view which shows details of the stage lock portion 126. Further, FIGS. 19 through 22 is a side view which show details of the stage lock portion 126.

In the stage lock portion 126, the substrate 72A and the substrate 72B, which form a portion of the base stand 12, are fixed integrally, and a supporting shaft 128 penetrates through the substrate 72A and the substrate 72B. A hook lever 130 is supported at the supporting shaft 128 at the substrate 72B side. A pawl 132 is formed at the upper end portion of the hook lever 130 such that the pawl 132 can be engaged with and removed from a lock pin 134 provided at the other end portion of the stage 16. In a state in which the pawl 132 of the hook lever 130 engages with the lock pin 134, the stage 16 is held in a horizontal state.

One end of a return spring 136, which is wound around the supporting shaft 128, is engaged with the hook lever 130, and the return spring 136 invariably urges the hook lever 130 in the direction in which the pawl 132 engages with the lock pin 134.

Further, an operation lever 138 is supported at the supporting shaft 128 at the substrate 72A side. At the upper end portion of the operation lever 138, an arm portion 140 extends toward the hook lever 130 so as to be able to press the side surface of the hook lever 130 at the lock pin 134 side. In this way, due to the rotation of the operation lever 138 around the supporting shaft 128, the arm portion 140 presses the hook lever 130, and the hook lever 130 is rotated in the direction in which the hook lever 130 separates (lock-releases) from the lock pin 134 against the urging force of the return spring 136.

One end of a return spring 142, which is wound around the supporting shaft 128, is engaged with the operation lever 138, such that the return spring 142 invariably urges the operation lever 138 in the direction in which the arm portion 140 presses the hook lever 130 (therefore, the direction opposite the urging direction of the return spring 136).

In this case, the urging force of the return spring 142 is set smaller than the urging force of the return spring 136. Accordingly, the arm portion 140 of the operation lever 138 usually presses and contacts the hook lever 130.

The lower end portion of the operation lever 138 corresponds to the distal end of the slide lever 110 disposed along the substrate 72A and can be engaged with a pressing projection 144 of the slide lever 110. Namely, as the slide lever 110 moves in the axial direction, the pressing projection 144 presses the operation lever 138 and can be rotated around the supporting shaft 128 against the urging force of the return spring 136.

After the above hook lever 130 separates (lock-releases) from the lock pin 134, driving force starts to be transmitted to the lifting gear 20. While the pressing projection 144 of the slide lever 110 continues to press the operation lever 138 (while the hook lever 130 separates from the lock pin 134), the distal end portion of the stage 16 is raised. Further, after the stage 16 is raised completely (60 degrees), the pressing projection 144 of the slide lever 110 is removed from the operation lever 138 and the operation lever 138 is automatically returned to the original position. The dimensions of respective parts and the like are determined by taking into consideration the timing of the above sequence.

Figure 23:
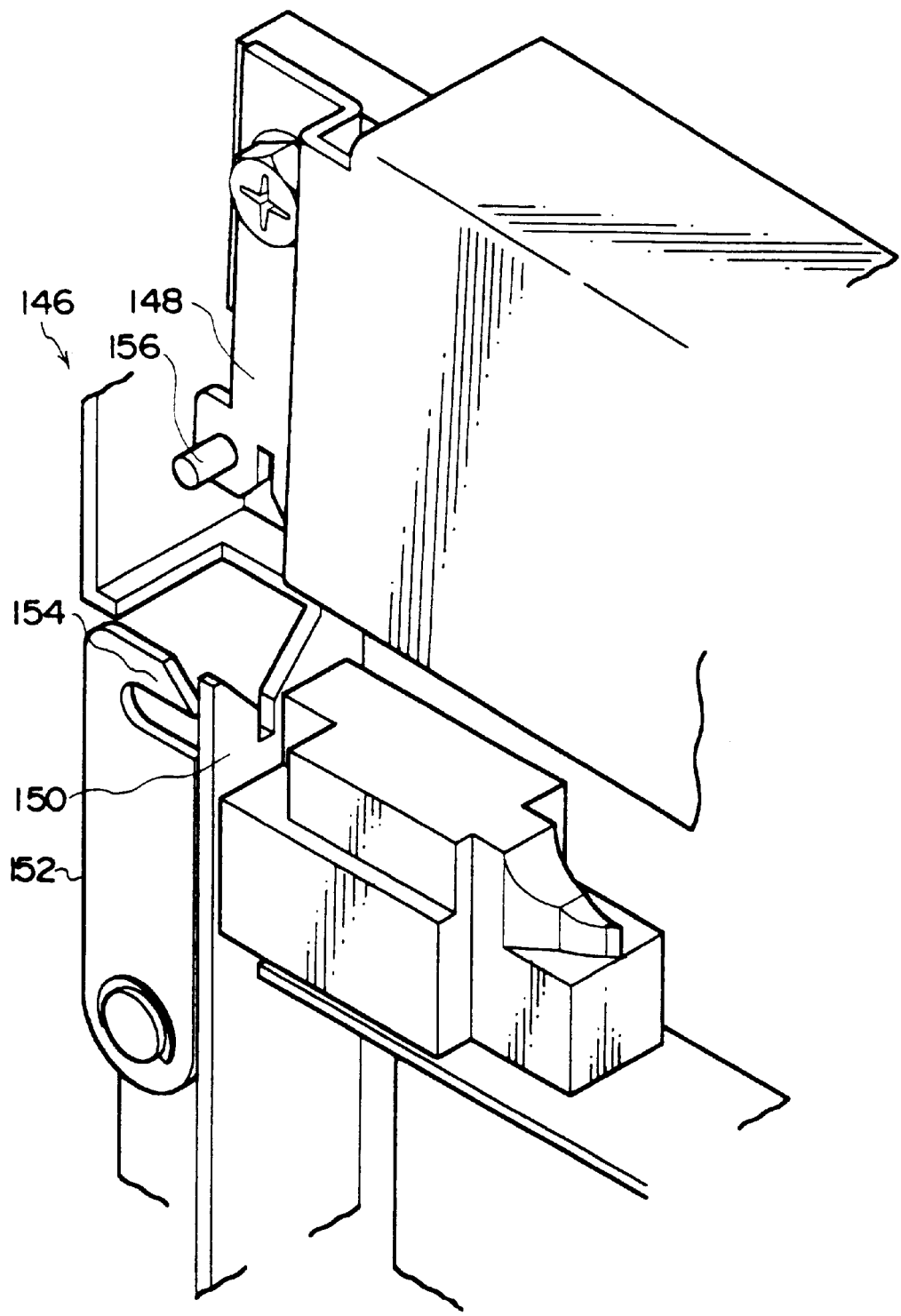
FIG. 23 is a perspective view which shows a structure of a lock portion in the image recording apparatus relating to the present embodiment.
Figure 24:
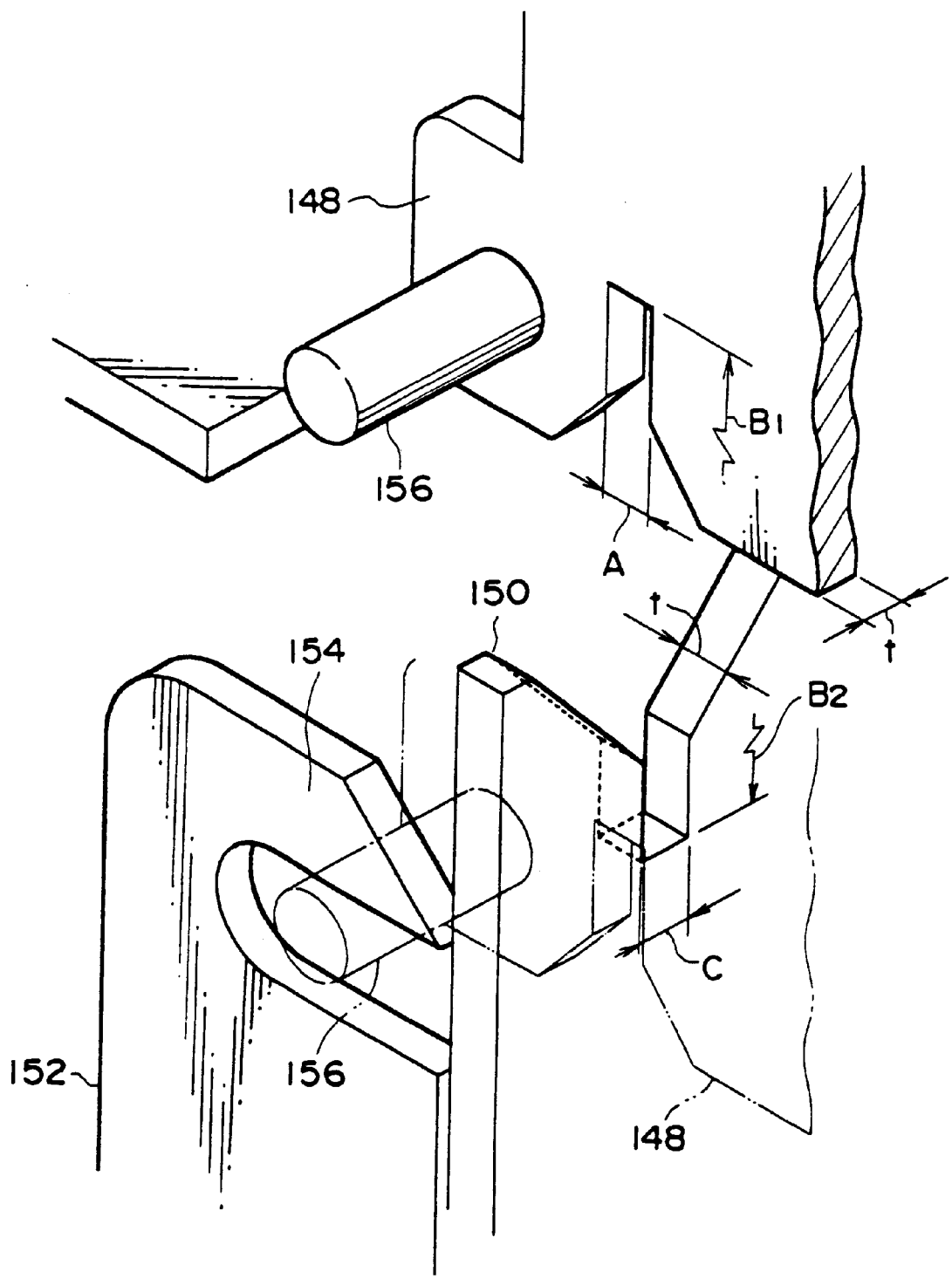
FIG. 24 is a perspective view which shows a structure of a latch plate of the lock portion in the image recording apparatus relating to the present embodiment.

The upper cover 14, which opens and closes in accordance with the above-described structure, is held at the base stand 12 by the lock portion 146. FIGS. 23 and 24 is a perspective view which shows the details of the lock portion 146.

A pair of latch plates 148, 150 are provided at the lock portion 146. The distal end portions of the latch plates 148, 150 are formed Y-shaped. The one latch plate 148 is fixed to the upper cover 14 and the other latch plate 150 is fixed to the base stand 12 (the substrate 72A) so that the Y-shaped portions thereof are opposed and orthogonal to each other. In this way, the upper cover 14 is positioned with respect to the base stand 12 as the Y-shaped portion of the latch plate 148 fits with the Y-shaped portion of the latch plate 150.

Further, a lock lever 152 is mounted to the vicinity of the latch plate 150 fixed to the base stand 12. A lock pawl 154 is formed at the upper end portion of the lock lever 152. The lock pawl 154 corresponds to a lock pin 156 which is provided at the latch plate 148 fixed to the upper cover 14. In a state in which the upper cover 14 is closed and the Y-shaped portion of the latch plate 148 fits with the Y-shaped portion of the latch plate 150, the lock pawl 154 engages with the lock pin 156. In a state in which the lock pawl 154 of the lock lever 152 engages with the lock pin 156, the upper cover 14 is held in a closed state.

Moreover, an opening/closing knob 158 (see FIGS. 5 through 7) is mounted to the rotational shaft of the lock lever 152. The lock lever 152 is rotated by operating the opening/closing knob 158 such that the upper cover 14 is opened.

Next, the operation of the present embodiment will be explained.

In the above-described image recording apparatus 10, a predetermined length of the photosensitive material 26 is withdrawn from the supply magazine 24 onto the stage 16. The image on the document is exposed onto the photosensitive material 26 placed on the stage 16 by the exposure unit 32.

Next, an image receiving material 48 within the image receiving material magazine 46 is sucked and removed by the suction disk 50 and conveyed to the attaching roller 42 (the outer periphery of the endless belt 40) of the attaching unit 34 disposed at the standby position via the guide portion 52. Further, the attaching unit 34 is moved and the conveyed image receiving material 48 is reversed as the image receiving material 48 is moved along with the endless belt 40. The image receiving material 48 is successively superposed on the photosensitive material 26 so that the image receiving material 48 is nipped between the endless belt 40 and the photosensitive material 26.

Further, at this time, before the image receiving material 48 and the photosensitive material 26 are superposed, water is successively applied to the photosensitive material 26 by the sponge 58 of the water application portion 38 which moves along with the attaching unit 34, and excess water is removed from the photosensitive material 26 by the squeeze roller 64.

As a result, the image receiving material 48 is successively attached to the photosensitive material 26, to which water is applied, on the stage 16.

The image receiving material 48 and the photosensitive material 26, which are attached on the stage 16, are heated by the stage 16 in a superposed state. In this way, heat development transfer is effected. Namely, the movable dye is discharged from the photosensitive material 26, and simultaneously, the dye is transferred onto the dye fixing layer of the image receiving material 48 and the image is obtained on the image receiving material 48.

After the heat development transfer, the attaching unit 34 moves to the initial position in the direction opposite the aforementioned direction. A predetermined length of the photosensitive material 26 is withdrawn due to the withdrawal of the attaching unit 34 and the image receiving material 48 is moved along with the photosensitive material 26 from the other end of the stage 16 to the outer side of the stage. The image receiving material 48 is peeled from the photosensitive material 26 due to the movement thereof and accumulated within a discharge tray 160.

Thereafter, the attaching unit 34, the water application portion 38, and the paper feeding portion 36 are in a standby state and prepare for a subsequent processing.

In the image recording apparatus 10 relating to the present embodiment, the upper cover 14 can be opened with respect to the base stand 12. Namely, the lock lever 152 is rotated by operating the opening/closing knob 158. As a result, the lock pawl 154 of the lock lever 152 is removed from the lock pin 156 of the latch plate 148 fixed to the upper cover 14, the state in which the upper cover 14 is closed and retained is released, and the upper cover 14 can be opened.

Further, in this case, the upper cover 14, which is connected to the base stand 12 by the intermediate hinge 74 of the hinge portion 70, can be opened and closed by two stages at predetermined angles (30 degrees and 90 degrees).

Figure 6:
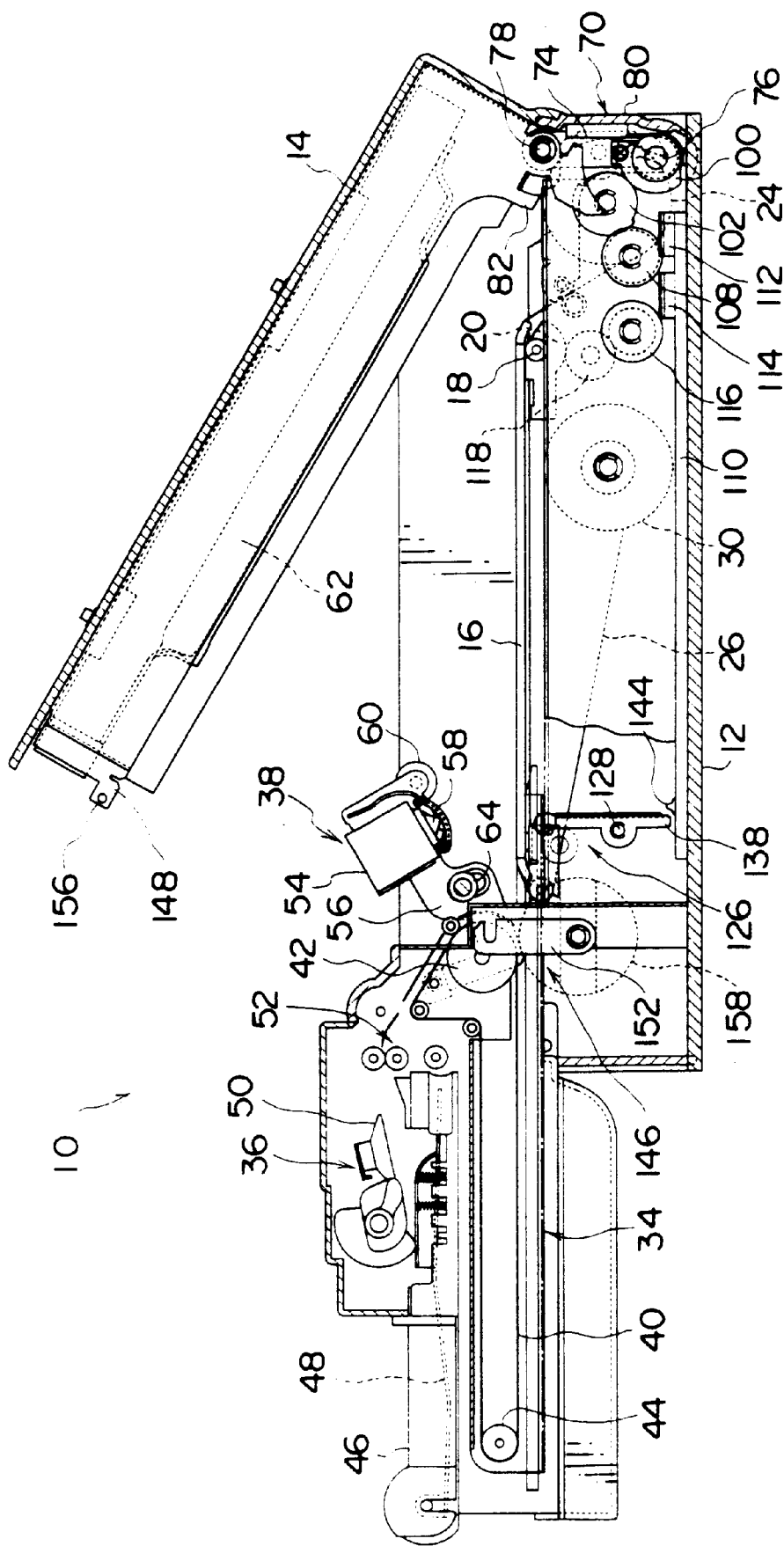
FIG. 6 is a cross-sectional view which, seen from the side, shows an overall structure of the image recording apparatus relating to the present embodiment in a state in which the upper cover is opened by one stage.
Figure 7:
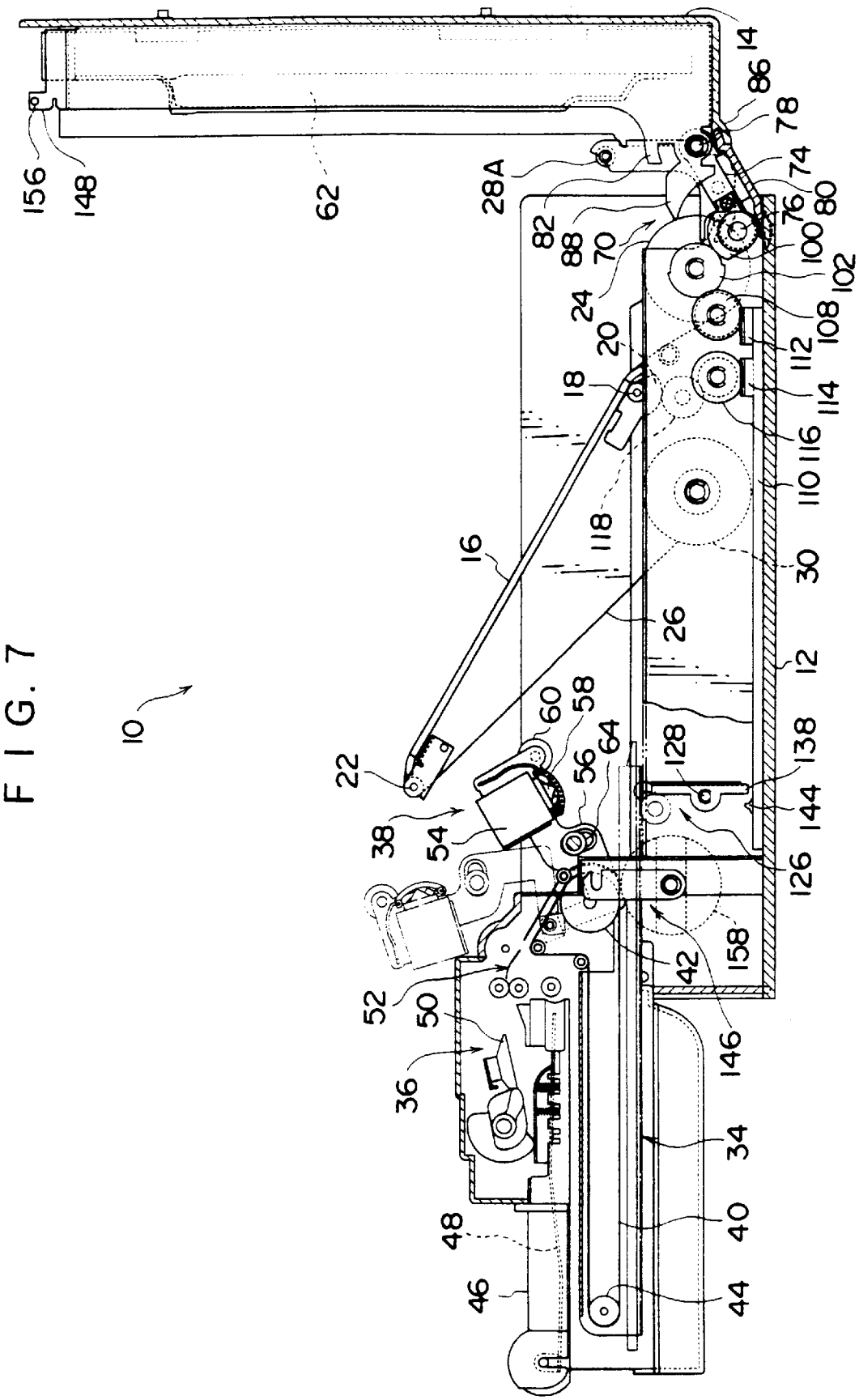
FIG. 7 is a cross-sectional view which, seen from the side, shows an overall structure of the image recording apparatus relating to the present embodiment in a state in which the upper cover is fully opened.

In this case, in the first stage opened/closed state (between the closed state and the state in which the upper cover 14 is opened by 30 degrees) of the upper cover 14, the upper cover 14 is opened and closed around the supporting shaft 78 (i.e., the side which is connected to the upper cover 14) of the intermediate hinge 74. In this way, as shown in FIG. 6, the water application portion 38 or the like which is disposed at the upper portion of the apparatus main body (within the base stand 12) is exposed. Therefore, it is easy to carry out inspection and maintenance, e.g., filling water within the tank 54 or the like.

On the other hand, in the second stage opened/closed state (between the state in which the upper cover 14 is opened by 30 degrees and the state in which the upper cover 14 is fully opened by 90 degrees) of the upper cover 14, the upper cover 14 is opened and closed along with the intermediate hinge 74 around the supporting shaft 76 (i.e., the side which is connected to the base stand 12) of the intermediate hinge 74. As a result, as shown in FIGS. 1 through 3 and 7, the inner portion of the apparatus main body (the base stand 12) is exposed by a larger amount.

At the time of second stage opening, in particular, the upper cover 14 rotates around the position (i.e., the supporting shaft 76 of the intermediate hinge 74) which is different from the rotational center (i.e., the supporting shaft 78 of the intermediate hinge 74) of the upper cover 14 at the time of first stage opening. Therefore, due to the separation of the rotational centers, the rotational angle of the upper cover 14 is even larger than that of the intermediate hinge 74 itself. Accordingly, the inner portion of the apparatus main body (the base stand 12) is exposed by a large amount.

Further, in this image recording apparatus 10, the auxiliary bracket 94 is rotatably mounted to the central portion of the intermediate hinge 74 (i.e., the position which is away from the supporting shaft 76 serving as the rotational center of the intermediate hinge 74). Therefore, when the intermediate hinge 74 is rotated, i.e., in the second stage opened/closed state, the auxiliary bracket 94 is rotated automatically in accordance with the rotation of the intermediate hinge 74.

In this case, the position at which the auxiliary bracket 94 is supported (i.e., the supporting shaft 92) is the position which is away from the one end rotational center (the supporting shaft 76) of the intermediate hinge 74. The displacement of one end portion of the auxiliary bracket 94 (the end portion at the notch portion 96 side) is prevented by the stationary pin 98. Accordingly, when the auxiliary bracket 94 is rotated due to the rotation of the intermediate hinge 74, the other end portion of the auxiliary bracket 94 (i.e., the withdrawing roller 28A) rotates at an angle larger than the rotational angle of the intermediate hinge 74. In the present embodiment, when the intermediate hinge 74 is rotated by 60 degrees (i.e., the state in which the upper cover 14 is fully opened), the withdrawing roller 28A is rotated by 90 degrees from the initial position. In this way, as shown in FIG. 13, the withdrawing roller 28A is not only separated from the withdrawing roller 28B so as to release the holding of the photosensitive material 26, but also withdrawn from the base stand 12. Thus, the workability of inspection, maintenance, and the like improves.

Further, when the intermediate hinge 74 rotates (i.e., at the time of second stage opening), the stage 16 is automatically raised.

Figure 20:
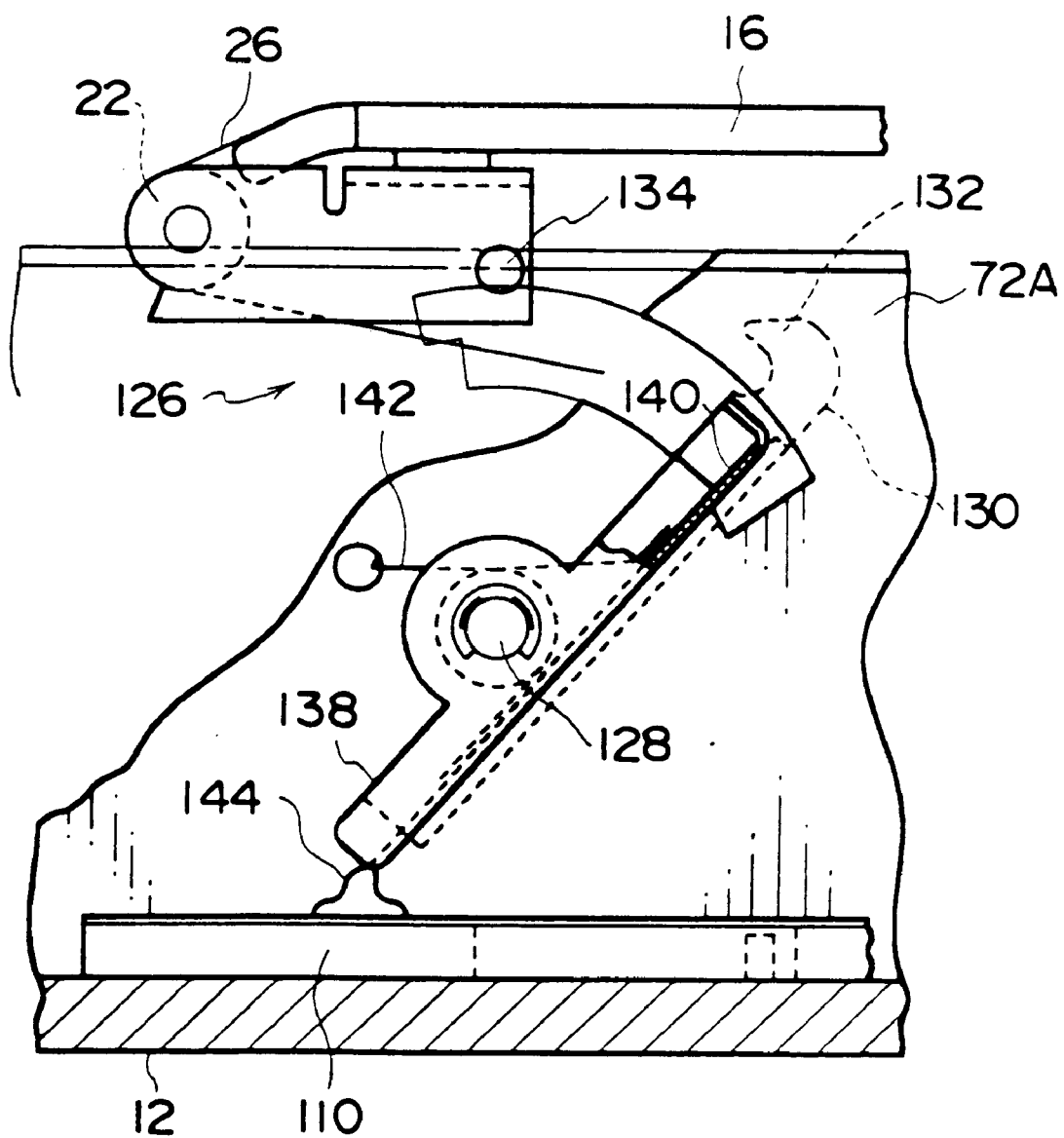
FIG. 20 is a side view which shows a structure of the stage lock portion in the image recording apparatus relating to the present embodiment.

Namely, when the intermediate hinge 74 rotates, the slide lever 110 is moved accordingly. Due to the movement of the slide lever 110, the operation lever 138 of the stage lock portion 126 is pressed by the pressing projection 144 of the slide lever 10 and rotated around the supporting shaft 128 against the urging force of the return spring 136. As a result, as shown in FIG. 20, the arm portion 140 of the operation lever 138 presses the hook lever 130, the hook lever 130 is rotated in the direction in which the hook lever 130 separates (lock-releases) from the lock pin 134 against the urging force of the return spring 136, and the pawl 132 of the hook lever 130 is removed from the lock pin 134. The retention of the stage 16 is thereby released.

Further, at this time, the moving force of the slide lever 110 starts to be transmitted to the lifting gear 20. While the pressing projection 144 of the slide lever 110 continues to press the operation lever 138 (while the hook lever 130 separates from the lock pin 134), the distal end portion of the stage 16 is lifted.

Figure 21:
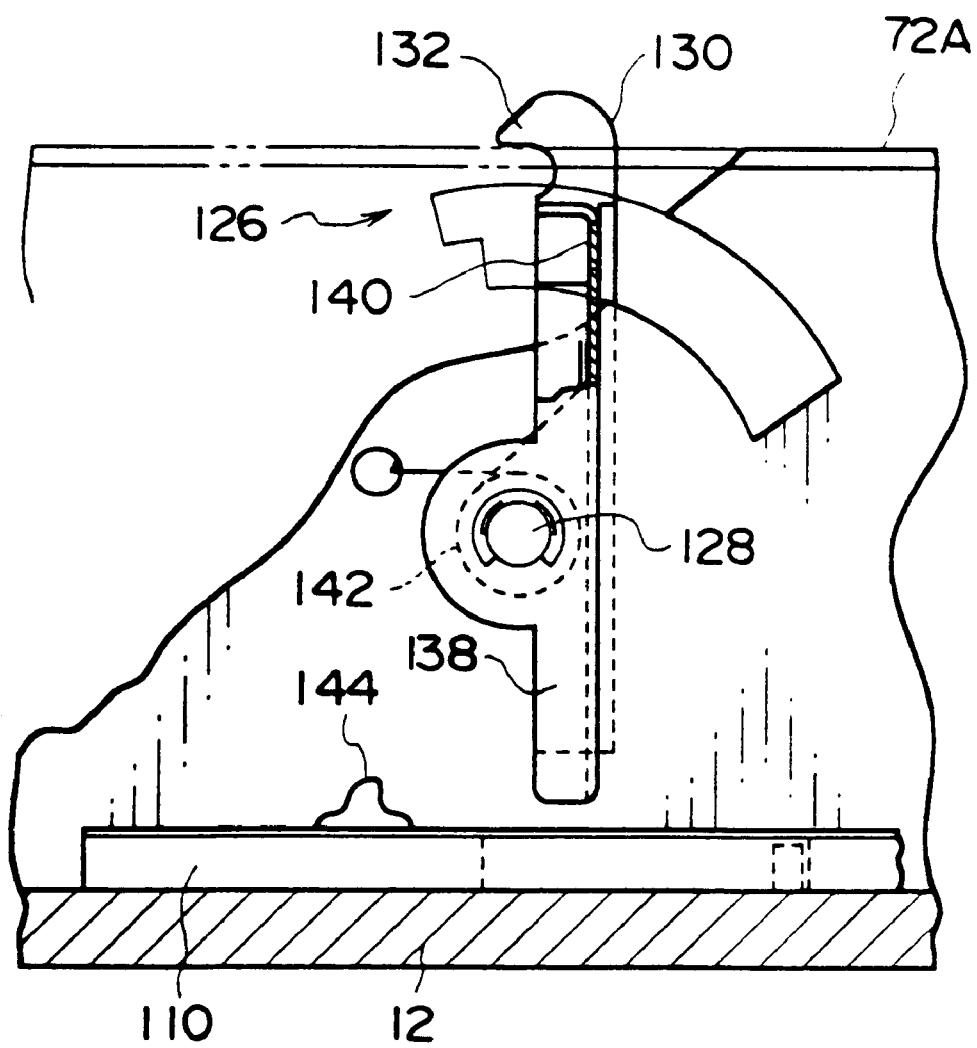
FIG. 21 is a side view which shows a structure of the stage lock portion in the image recording apparatus relating to the present embodiment.

Moreover, after the stage 16 is completely lifted (60 degrees), as shown in FIG. 21, the pressing projection 144 of the slide lever 110 is removed from the operation lever 138, and the operation lever 138 and the hook lever 130 are automatically returned to the original positions.

Figure 22:
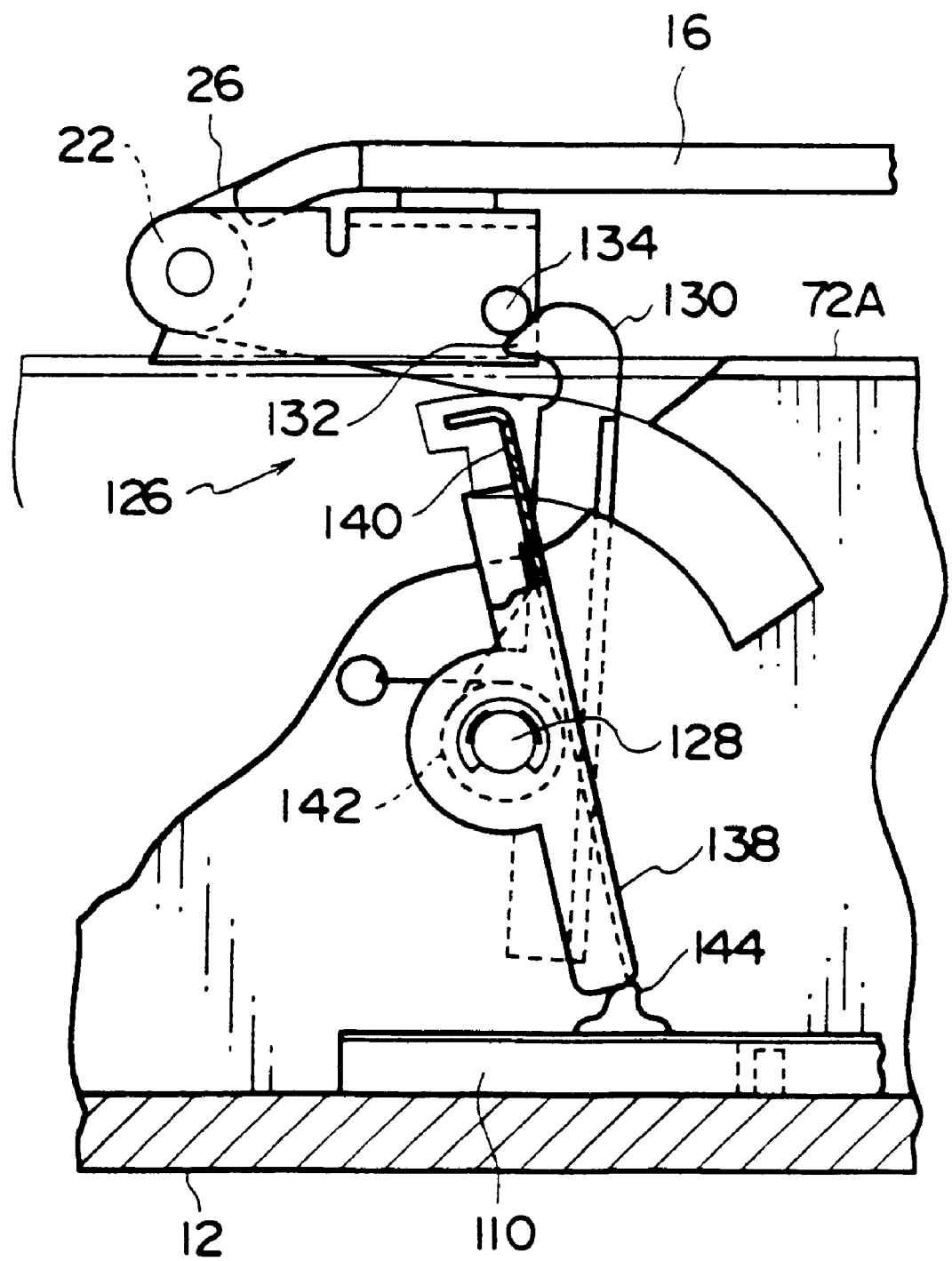
FIG. 22 is a side view which shows a structure of the stage lock portion in the image recording apparatus relating to the present embodiment.

When the pressing projection 144 of the slide lever 110 is removed from the operation lever 138, and thereafter, the slide lever 110 is returned in the direction opposite the aforementioned direction (in other words, when the upper cover 14 is closed), the pressing projection 144 presses the operation lever 138 in the direction opposite the aforementioned direction. As a result, as shown in FIG. 22, only the operation lever 138 is temporarily rotated in the direction opposite the aforementioned direction and separating from the hook lever 130 against the urging force of the return spring 142, and the pressing projection 144 of the slide lever 110 is again removed form the operation lever 138 and completely returns to the original state.

Furthermore, when the distal end portion of the stage 16 is lifted in this way (when the intermediate hinge 74 rotates), the intermediate gear 102 is rotated accordingly. As shown by a chain double-dashed line in FIG. 14, the holder 104 is moved along the feed screw 106 in the axial direction thereof. As a result, the retention of the supply magazine 24 is released. In the same way, when the intermediate hinge 74 rotates and the slide lever 110 moves, the withdrawing arm 120 presses the cam 122. As shown in FIG. 17, the cam 122 and the holder 124 are moved in the axial direction thereof. As a result, the retention of the take-up magazine 30 is released.

As mentioned above, in the second stage opened state of the upper cover 14, not only the inner portion of the apparatus main body (base stand 12) is exposed by a large amount, the withdrawing roller 28A and the upper cover 14 are moved together and withdrawn from the base stand 12 by a large amount. Further, the stage 16 is raised automatically and the retention of the supply magazine 24 and the take-up magazine 30 is released. Therefore, it is easy to carry out inspection and maintenance, such as replacement of the supply magazine 24, the take-up magazine 30, and the like.

The supply magazine 24 and the take-up magazine 30 can be integrally formed and simultaneously attached/removed via the stage 16.

Furthermore, in the image recording apparatus 10, in the first stage opened/closed state of the upper cover 14, the rotation of the intermediate hinge 74 around the supporting shaft 76 (i.e., the side connected to the base stand 12) of the intermediate hinge 74 is restricted by the pawl portion 82. As a result, the upper cover 14 can be opened and closed only around the supporting shaft 78 (i.e., the side connected to the upper cover 14) of the intermediate hinge 74. Namely, unless after the upper cover 14 is completely in the first stage opened/closed state (unless after the movement of the upper cover 14 from the closed state to the 30-degree opened state is completed), the intermediate hinge 74 cannot rotate around the supporting shaft 76 (i.e., the side connected to the base stand 12) and the intermediate hinge 74 cannot be moved to the second stage opened/closed state accidentally.

On the other hand, when the upper cover 14 is in the first stage opened/closed state (the 30-degree opened state), and thereafter, the upper cover 14 and the intermediate hinge 74 are in the second stage opened/closed state, the rotation of the upper cover 14 around the supporting shaft 78 (i.e., the side connected to the upper cover 14) of the intermediate hinge 74 is restricted due to the engagement between the pawl portion 88 and the engaging convex portion 90 and the engagement between the slide engaging portion 86 and the auxiliary cover 80 (the state shown in FIG. 13). As a result, the intermediate hinge 74 and the upper cover 14 can be opened and closed only around the supporting shaft 76 (i.e., the side connected to the base stand 12) of the intermediate hinge 74. Namely, unless the upper cover 14, which is in the second stage opened/closed state, and the intermediate hinge 74 are completely moved to the first stage opened/closed state (unless after the closing movement of the upper cover 14 and the intermediate hinge 74 from the second stage to the first stage is completed), the upper cover 14 cannot be rotated around the supporting shaft 78 (i.e., the side connected to the upper cover 14) of the intermediate hinge 74 and the upper cover 14 in the second stage opened/closed state does not rotate accidentally.

In this way, unless after the first stage opening movement of the upper cover 14 is completed, the intermediate hinge 74 cannot rotate. On the other hand, unless after the closing movement of the intermediate hinge 74 from the second stage to the first stage is completed, the upper cover 14 cannot rotate.

Therefore, the first stage opened/closed state and the second stage opened/closed state can successively take place reliably and regularly.

On the other hand, in a case in which the upper cover 14, which has been opened as mentioned above, is closed, the lock pawl 154 of the lock lever 152 engages the lock pin 156 of the latch plate 148 in the lock portion 146, and the upper cover 14 is held in a closed state.

In this case, the Y-shaped portion of the latch plate 148 which is fixed to the upper cover 14 and the Y-shaped portion of the latch plate 150 which is fixed to the base stand 12 (the substrate 72A) are fit with each other. Thus, the upper cover 14 is positioned with respect to the base stand 12.

Namely, as shown in FIG. 24, the position of the upper cover 14, which is connected to and supported at the base stand 12 by the hinge portion 70 (the intermediate hinge 74), in the apparatus lengthwise direction (the lengthwise direction on the page surface in FIGS. 4 through 8) with respect to the base stand 12 is determined univocally by the notch gap dimension A of the Y-shaped portion of the latch plate 148 and the plate thickness dimension t of the Y-shaped portion of the latch plate 150 inserted into that of latch plate 148. On the other hand, the position of the upper cover 14 in the apparatus height direction with respect to the base stand 12 is determined univocally by the notch depth position $B_1$ of the Y-shaped portion of the latch plate 148 and the notch depth position $B_2$ of the Y-shaped portion of the latch plate 150 (in other words, by the position at which the Y-shaped portion of the latch plate 148 abuts the Y-shaped portion of the latch plate 150). Furthermore, the position of the upper cover 14 in the apparatus widthwise direction with respect to the base stand 12 is determined univocally by the notch gap dimension C of the Y-shaped portion of the latch plate 150 and the plate thickness dimension t of the Y-shaped portion of the latch plate 148 fit with that of latch plate 150.

Therefore, if the Y-shaped portion of the latch plate 148 which is fixed to the upper cover 14 and the Y-shaped portion of the latch plate 150 which is fixed to the base stand 12 are manufactured and assembled precisely, the upper cover 14 can be positioned with high precision.

As a result, there is no need to increase unnecessarily the rigidities of these connecting portions which connect and support the upper cover 14 at the base stand 12 by the intermediate hinge 74.

As mentioned above, in the image recording apparatus 10 relating to the present embodiment, the necessary place can be exposed suitably by simple operation and workability of inspection, maintenance, and the like improves.

The photosensitive material 26 which is applicable to the image recording apparatus 10 relating to the present embodiment includes a so-called heat development photosensitive material, in which a latent image obtained by imagewise exposure is heat-development-transferred onto the image receiving material 48 in the presence of solvent for image formation such as water and a visible image is thereby obtained. The heat development photosensitive material basically includes a photosensitive silver halide, a reducing agent, a binder and a dye providing material (the reducing agent may serve as the dye providing material). The photosensitive material may further include an organometallic hydrochloric agent, as occasion demands.

The heat development photosensitive material may be the one which provides negative images or the one which provides positive images upon exposure. The method of providing positive images includes the one which directly uses positive emulsion as silver halide emulsion (there are two types of methods: a method of using core creation agent and an optical fogging method), or the one which uses a dye providing material which discharges a diffusing dye image positively.

Japanese Patent Application Laid-Open (JP-A) No. 6-161070 and JP-A No. 6-289555, for example, disclose a heat development photosensitive material to be used in the method of providing positive images. Further, JP-A No. 5-181246 and JP-A No. 6-242546, for example, disclose a heat development photosensitive material to be used in the method of providing negative images.

Moreover, water is used, for example, as the solvent for image formation. However, the water is not limited to a so-called pure water and includes water which is used widely and generally. Further, the water may be a mixed solvent of pure water and solvent having a low-boiling point such as methanol, DMF, acetone, diisobutyl ketone, and the like. Further, the water may be a solution which includes image forming accelerator, antifoggant, development stopping agent, hydrophilic heat solvent, and the like.

As described hereinbefore, the image recording apparatus relating to the present invention achieves a superior effect in that the necessary place can be exposed suitably by simple operation and the workability of inspection, maintenance, and the like improves.

What is claimed is:

1. An image recording apparatus in which a photosensitive material is exposed so as to obtain a visible image, comprising:
    a base stand;
    an upper cover; and
    a hinge portion connecting said upper cover to said base stand, said hinge portion including first and second distinct pivot axes such that said cover is movable from a closed position to a first opened position corresponding to a first stage and from said first opened position to a second opened position corresponding to a second stage, wherein said cover is rotated with respect to said first axis during said first stage and with respect to said second axis during said second stage and wherein said first axis translates from a first position to a second position during said second stage.

2. An image recording apparatus according to claim 1, wherein said hinge portion includes an intermediate hinge member having one end rotatably supported at said base stand and another end rotatably connected to said upper cover, said other end defining said first pivot axis and said one end defining said second pivot axis.

3. An image recording apparatus according to claim 2, further comprising:
    a first restricting pawl which, in the first stage restricts the rotation of said intermediate hinge member around the one end of said intermediate hinge member; and
    a second restricting pawl which, in the second stage restricts the rotation of said upper cover around the other end of said intermediate hinge member.

4. An image recording apparatus according to claim 3, wherein said first restricting pawl is formed at said upper cover, and restriction of the rotation of said intermediate hinge member is released due to the removal of said first restricting pawl from an engagement hole which is formed at said base stand.

5. An image recording apparatus according to claim 4, further comprising:
    engaging means which, in the first stage of said upper cover, prevents the rotation of said upper cover at the time of removal of said first restricting pawl from said engagement hole.

6. An image recording apparatus according to claim 2, further comprising:
    an auxiliary bracket which is rotatably supported at said intermediate hinge member at a position which is away from the one end rotational center of said intermediate hinge member, and a displacement of one end portion of said auxiliary bracket being prevented; and
    a roller which is mounted to another end portion of said auxiliary bracket, and said roller rotating at an angle larger than a rotational angle of said intermediate hinge member due to the rotation of said intermediate hinge member around the one end of said intermediate hinge member.

7. An image recording apparatus according to claim 3, further comprising:
    an auxiliary bracket which is rotatably supported at said intermediate hinge member at a position which is away from the one end rotational center of said intermediate hinge member, and a displacement of one end portion of said auxiliary bracket being prevented; and
    a roller which is mounted to another end portion of said auxiliary bracket, and said roller rotating at an angle larger than a rotational angle of said intermediate hinge member due to the rotation of said intermediate hinge member around the one end of said intermediate hinge member.

8. An image recording apparatus according to claim 2, wherein at the first stage only the upper cover rotates with respect to the first axis without the intermediate hinge member rotating with respect to the second axis, and at the second stage the intermediate hinge member rotates with respect to the second axis.

9. An image recording apparatus according to claim 2, wherein at the second stage, the intermediate hinge member and the upper cover integrally rotate with respect to the second axis.

10. An image recording apparatus in which a photosensitive material is exposed so as to obtain a visible image, comprising:
    an apparatus main body formed by a base stand and an upper cover, and said upper cover connected to said base stand by a hinge portion so that said upper cover is able to be opened and closed; and interlocking means for driving a movable part, which is provided within the apparatus main body in response to the opening and closing of said upper cover, wherein said hinge portion includes first and second distinct pivot axes such that said cover is movable from a closed position to a first opened position corresponding to a first stage and from said first opened position to a second opened position corresponding to a second stage, wherein said cover is rotated with respect to said first axis during said first stage and with respect to said second axis during said second stage, and wherein said first axis translates from a first position to a second position during said second stage.

11. An image recording apparatus according to claim 10, wherein said hinge portion includes an intermediate hinge member having one end rotatably supported at said base stand and having another end rotatably connected to said upper cover, said other end defining said first pivot axis and said one end defining said second pivot axis, and said interlocking means drives said movable part interlocking with the rotation of said upper cover and said intermediate hinge member around the one end of said intermediate hinge member in the second stage.

12. An image recording apparatus according to claim 11, wherein said movable part serves as an auxiliary bracket which is rotatably supported at said intermediate hinge member at a position which is away from the one end rotational center of said intermediate hinge member, and a displacement of one end portion of said auxiliary bracket is prevented, and a roller is mounted to another end portion of said auxiliary bracket, and said roller rotates at an angle larger than a rotational angle of said intermediate hinge member due to the rotation of said intermediate hinge member around the one end of said intermediate hinge member.

13. An image recording apparatus according to claim 11, wherein in said image recording apparatus, the photosensitive material is exposed, and thereafter, the photosensitive material and an image receiving material are superposed and heat-development-transferred so that a visible image is obtained on the image receiving material, and said movable part serves as a stage in which one end portion is rotatably supported at said base stand and in which the photosensitive material and the image receiving material are superposed and heat-development-transferred, and said interlocking means raises and lowers a distal end portion of said stage.

14. An image recording apparatus according to claim 11, wherein a photosensitive material magazine winds and accommodates the photosensitive material in a roll-form, and said movable part serves as a holder for holding said photosensitive material magazine, and said interlocking means drives said holder in a direction in which the holding of the photosensitive material magazine is released.

15. An image recording apparatus according to claim 13, wherein a stage lock portion engages with another end portion of said stage and holds said stage in a horizontal state, and said interlocking means drives said stage lock portion interlocking with the rotation of said upper cover and said intermediate hinge member around the one end of said intermediate hinge member in the second stage opened state so as to release the holding state.

16. An image recording apparatus according to claim 15, wherein the timing of said interlocking means is determined so that said stage lock portion is driven, the holding state is released, and thereafter, the other end portion of said stage is raised.

17. An image recording apparatus in which a photosensitive material is exposed so as to obtain a visible image, comprising:

a base stand;

an upper cover;

a hinge portion connecting said upper cover to said base stand;

a movable part being movably disposed on said base stand; and a gear mechanism linking said hinge portion to said movable part and for moving said movable part in response to movement of said hinge portion, wherein as said gear mechanism rotates with said hinge portion, said movable part being engaged with a plurality of rotating members operating to move a stage located in said apparatus, wherein said hinge portion includes first and second distinct pivot axes such that said cover is movable from a closed position to a first opened position corresponding to a first stage and from said first opened position to a second opened position corresponding to a second stage, wherein said cover is rotated with respect to said first axis during said first stage and with respect to said second axis during said second stage, and wherein said first axis translates from a first position to a second position during said second stage.

18. An image recording apparatus according to claim 17, wherein said hinge portion includes first and second distinct pivot axes such that said cover is movable from a closed position to a first opened position corresponding to a first stage and from said first opened position to a second opened position corresponding to a second stage, wherein said cover is rotated with respect to said first axis during said first stage and with respect to said second axis during said second stage.

19. An image recording apparatus according to claim 18, wherein said hinge portion includes an intermediate hinge member having one end rotatably supported at said base stand and another end rotatably connected to said upper cover, said other end defining said first pivot axis and said one end defining said second pivot axis.

20. An image recording apparatus according to claim 19, further comprising:

a first restricting pawl which, in the first stage restricts the rotation of said intermediate hinge member around the one end of said intermediate hinge member; and a second restricting pawl which, in the second stage restricts the rotation of said upper cover around the other end of said intermediate hinge member.

21. An image recording apparatus according to claim 19, further comprising:

an auxiliary bracket which is rotatably supported at said intermediate hinge member at a position which is away from the one end rotational center of said intermediate hinge member, and a displacement of one end portion of said auxiliary bracket being prevented; and a roller which is mounted to another end portion of said auxiliary bracket, and said roller rotating at an angle larger than a rotational angle of said intermediate hinge member due to the rotation of said intermediate hinge member around the one end of said intermediate hinge member.

22. An image recording apparatus according to claim 20, further comprising:

an auxiliary bracket which is rotatably supported at said intermediate hinge member at a position which is away from the one end rotational center of said intermediate hinge member, and the displacement of one end portion of said auxiliary bracket being prevented; and a roller which is mounted to another end portion of said auxiliary bracket, and said roller rotating at an angle larger than the rotational angle of said intermediate hinge member due to the rotation of said intermediate hinge member around the one end of said intermediate hinge member.

23. An image recording apparatus according to claim 20, wherein said first restricting pawl is formed at said upper cover, and restriction of the rotation of said intermediate hinge member is released due to the removal of said first restricting pawl from an engagement hole which is formed at said base stand.

24. An image recording apparatus according to claim 23, further comprsing:

engaging means which, in the first stage of said upper cover, prevents the rotation of said upper cover at the time of removal of said first restricting pawl from said engagement hole.

* * * * *